US010172212B2

(12) United States Patent
Kelley et al.

(10) Patent No.: US 10,172,212 B2
(45) Date of Patent: Jan. 1, 2019

(54) SECURITY LIGHTING FIXTURE

(71) Applicant: HAMPTON PRODUCTS INTERNATIONAL CORPORATION, Foothill Ranch, CA (US)

(72) Inventors: Kim Kelley, The Woodlands, TX (US); Ben Huang, Taipei (TW)

(73) Assignee: Hampton Products International Corporation, Foothill Ranch, CA (US)

( * ) Notice: Subject to any disclaimer, the term of this patent is extended or adjusted under 35 U.S.C. 154(b) by 0 days.

(21) Appl. No.: 15/269,664

(22) Filed: Sep. 19, 2016

(65) Prior Publication Data

US 2017/0013695 A1 Jan. 12, 2017

Related U.S. Application Data

(63) Continuation-in-part of application No. PCT/US2015/066191, filed on Dec. 16, 2015.

(60) Provisional application No. 62/092,718, filed on Dec. 16, 2014.

(51) Int. Cl.
*H05B 37/02* (2006.01)
*H05B 33/08* (2006.01)
*H05B 39/04* (2006.01)

(52) U.S. Cl.
CPC ..... *H05B 37/0218* (2013.01); *H05B 33/0815* (2013.01); *H05B 33/0854* (2013.01); *H05B 37/0227* (2013.01); *H05B 37/0272* (2013.01); *H05B 39/042* (2013.01); *Y02B 20/44* (2013.01); *Y02B 20/46* (2013.01)

(58) Field of Classification Search
CPC ............ H05B 37/0272; H05B 37/0227; H05B 33/0854; H05B 33/0803; H05B 33/0845; H05B 37/0218; H05B 33/0815; H05B 37/0281; H05B 33/0842; H05B 39/08; H05B 37/0263; H05B 37/03
USPC ......... 315/86, 291, 159, 152, 297, 307, 153, 315/158, 209 R, 250
See application file for complete search history.

(56) References Cited

U.S. PATENT DOCUMENTS

| 5,717,295 A | 2/1998 | Nerone |
| 6,326,740 B1 | 12/2001 | Chang et al. |
| 2002/0180378 A1 | 12/2002 | Griffin et al. |
| 2006/0125426 A1* | 6/2006 | Veskovic ........... H05B 37/0254 315/312 |

(Continued)

FOREIGN PATENT DOCUMENTS

WO  WO2014170193  10/2014

OTHER PUBLICATIONS

International Search Report and Written Opinion on corresponding PCT application (PCT/US2015/066191) from International Searching Authority (USPTO) dated Mar. 11, 2016.

*Primary Examiner* — Wei Chan
(74) *Attorney, Agent, or Firm* — Womble Bond Dickinson (US) LLP

(57) ABSTRACT

A lighting system includes a control unit for controlling brightness level of a light source based on a photosensor output signal and a motion sensor output signal. The control unit may increase the brightness level of the light source as ambient light level decreases, or decreases the brightness level as the ambient light level increases. The control unit may also increase the brightness level to a maximum brightness level when motion is detected.

28 Claims, 14 Drawing Sheets

(56) References Cited

U.S. PATENT DOCUMENTS

| | | | | |
|---|---|---|---|---|
| 2011/0080104 A1* | 4/2011 | Gray | .................. | H05B 41/3927 |
| | | | | 315/246 |
| 2011/0121744 A1* | 5/2011 | Salvestrini | ......... | H05B 33/0815 |
| | | | | 315/246 |
| 2011/0254525 A1* | 10/2011 | Gaknoki | ............ | H05B 33/0815 |
| | | | | 323/283 |
| 2012/0049747 A1* | 3/2012 | Chen | .................. | H05B 33/0809 |
| | | | | 315/159 |
| 2012/0068686 A1* | 3/2012 | Steiner | ............... | H05B 37/0227 |
| | | | | 323/318 |
| 2012/0235579 A1* | 9/2012 | Chemel | ................... | F21S 2/005 |
| | | | | 315/152 |
| 2012/0256892 A1 | 10/2012 | Hung et al. | | |
| 2013/0175931 A1* | 7/2013 | Sadwick | ................ | H05B 37/02 |
| | | | | 315/158 |
| 2013/0257291 A1 | 10/2013 | Tabor | | |
| 2014/0265880 A1* | 9/2014 | Taipale | .............. | H05B 37/0263 |
| | | | | 315/158 |
| 2014/0354150 A1* | 12/2014 | Joseph | ............... | H05B 33/0869 |
| | | | | 315/51 |
| 2015/0108904 A1* | 4/2015 | Chen | .................... | H03K 17/133 |
| | | | | 315/153 |
| 2016/0066379 A1* | 3/2016 | Salvestrini | ......... | H05B 33/0815 |
| | | | | 323/300 |
| 2016/0183344 A1* | 6/2016 | Chitta | .................. | G05B 19/102 |
| | | | | 315/294 |
| 2018/0012137 A1* | 1/2018 | Wright | ................... | G06N 7/005 |

* cited by examiner

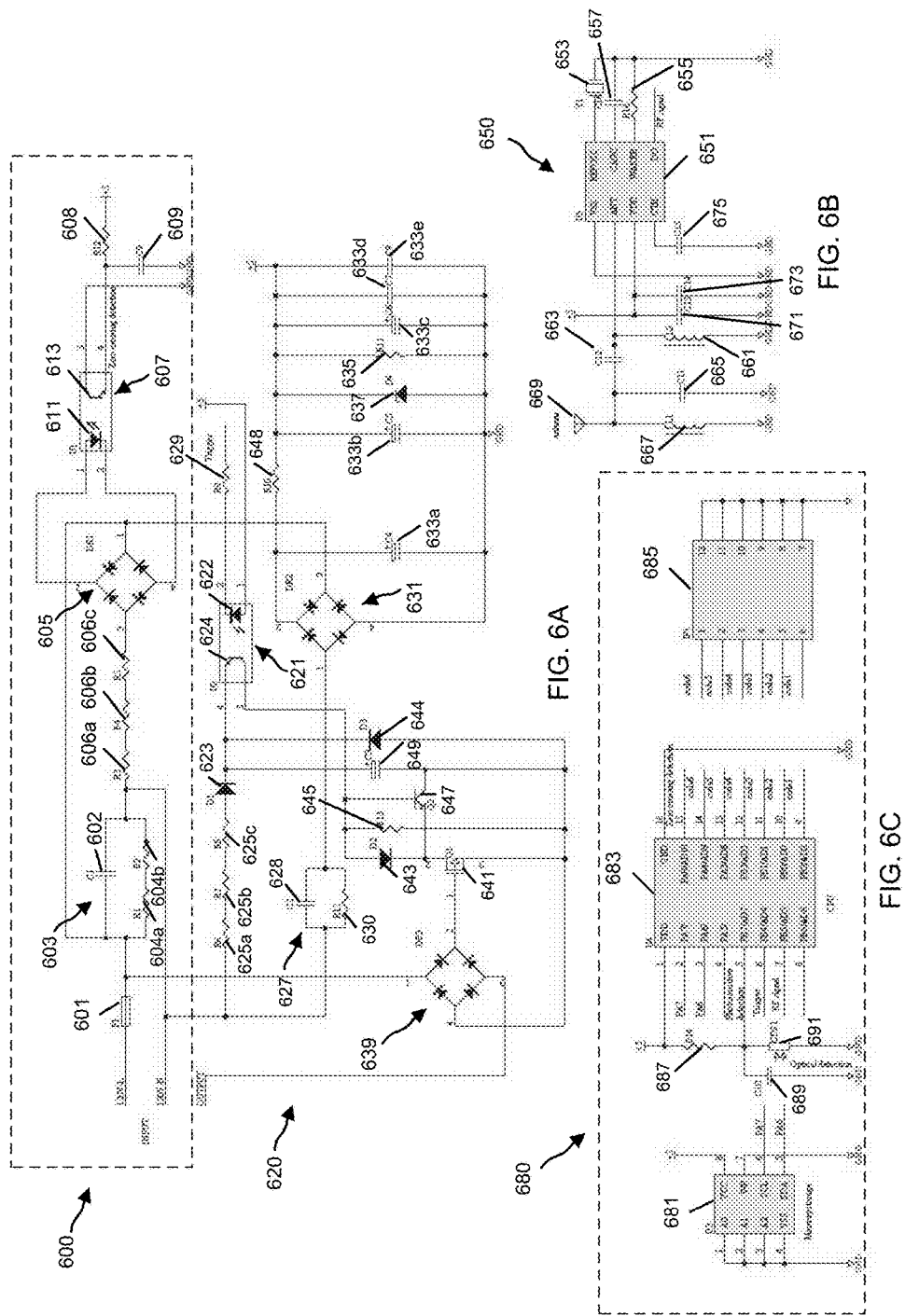

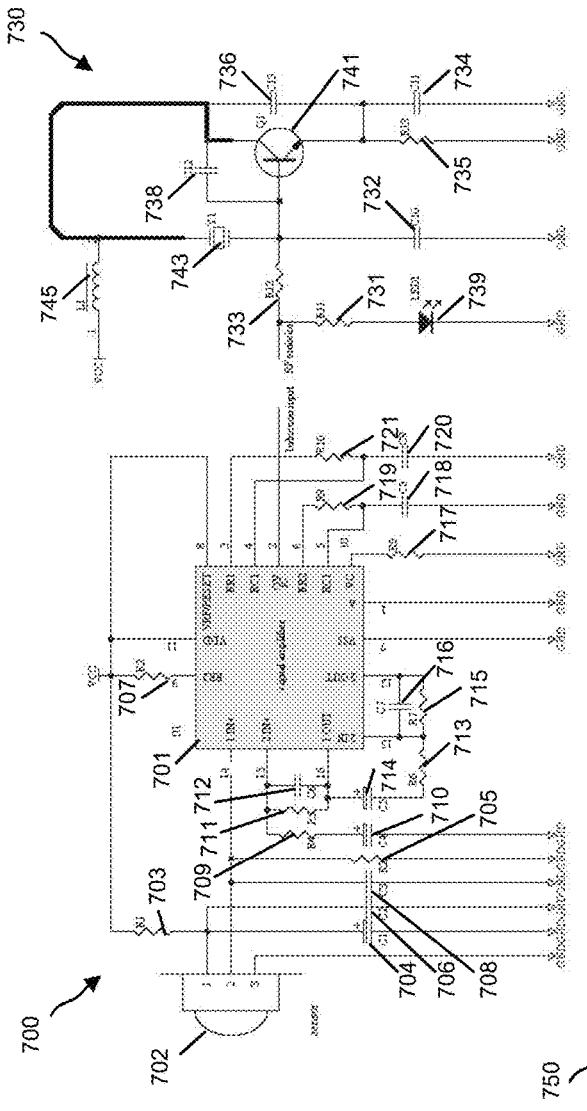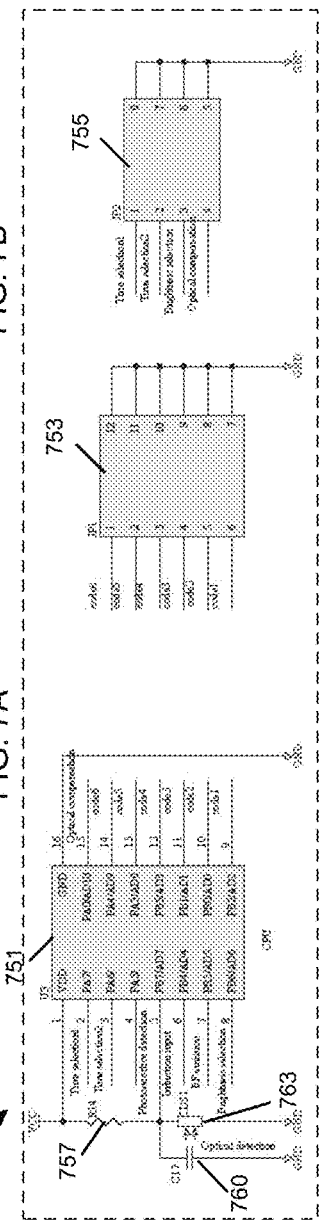
FIG. 7A
FIG. 7B
FIG. 7C

SECURITY LIGHTING FIXTURE

CROSS-REFERENCE TO RELATED APPLICATIONS

This application is a continuation-in-part (CIP) of PCT Patent Application No. PCT/US2015/066191, which claims the benefit, under 35 U.S.C. § 119(e), of U.S. Provisional Application No. 62/092,718; filed Dec. 16, 2014. The disclosures of both prior applications are incorporated herein by reference in their entireties.

FEDERALLY SPONSORED RESEARCH OR DEVELOPMENT

Not Applicable.

BACKGROUND

This disclosure relates generally to lighting systems, and more particularly to lighting systems that provide a variable level of illumination inversely proportional to ambient light levels.

A lighting system is often used as a preventive measure against intrusions or criminal activities on a piece of property. For example, security lighting may be used to help with the detection of intruders, to deter intruders, or simply to increase the feeling of safety for the person in possession of the property.

Generally, security lighting systems only switch on or activate when a person or moving object approaches and is detected, for example by a motion sensor. Otherwise, these systems remain off, or switch off after a period of time elapses subsequent to the last detection of motion. A security lighting system that turns on based merely on a detection of motion may not deter an intruder. Furthermore, such security measure may easily be circumvented.

Accordingly, there remains a need for a lighting system that illuminates based not only on a detection of motion, but also on ambient light level.

SUMMARY

In accordance with one aspect of this disclosure, a lighting system comprises a motion sensor configured to detect motion within an area, and to generate and communicate a motion sensor output signal when motion is detected; a control unit coupled to the motion sensor comprising a photosensor configured to sense ambient light and to generate a first photosensor output signal indicative of a first ambient light level and a second photosensor output signal indicative of a second ambient light level; and a processing unit coupled to the photosensor and configured to control illumination of a light source by providing a first trigger signal based on the first photosensor output signal, a second trigger signal based on the second photosensor output signal, and a third trigger signal responsive to the motion sensor output signal; wherein the light source is configured to illuminate at a first brightness level based on the first trigger signal, to illuminate at a second brightness level based on the second trigger signal, and to illuminate at a third brightness level based on the third trigger signal.

In some embodiments, the lighting system further comprises a motion sensor receiver wirelessly coupled to the motion sensor, wherein the motion sensor receiver configured to provide a motion sensor receiver output signal based on the motion sensor output signal, and wherein the processing unit is configured to provide the third trigger signal based on the motion sensor receiver output signal.

In some embodiments, the control unit further comprises a zero-crossing detector configured to receive an input AC voltage (VAC) and to provide a zero-crossing detection signal based on the VAC.

In some embodiments, the first trigger signal is delayed by a first delay period relative to the zero-crossing detection signal and the second trigger signal is delayed by a second delay period relative to the zero-crossing detection signal. The first delay period may be greater than or less than the second delay period.

In some embodiments, the control unit further includes a switching device configured to regulate provision of power to the light source. For example, the switching device may provide power to the light source at a first phase angle of an AC cycle based on the first trigger signal, at a second phase angle of the AC cycle based on the second trigger signal, and at a third phase angle of the AC cycle based on the third trigger signal.

In accordance with another aspect of the disclosure, a lighting unit comprises a motion sensor configured to detect motion of an object in a vicinity of a light source and to communicate a motion sensor output signal responsive to detected motion; a photosensor configured to detect ambient light and to generate a photosensor output signal having a value inversely proportional to an ambient light level; and a processing unit configured to operate the light source at a brightness level based on the photosensor output signal and the motion sensor output signal.

In some embodiments, the lighting unit further comprises a zero-crossing detector configured to generate a zero-crossing detection signal based on an input AC voltage (VAC).

In some embodiments, the processing unit is configured to generate a trigger signal having a time delay relative to the zero-crossing detection signal for controlling the brightness of the light source, the time delay being inversely proportional to the brightness of the light source.

In some embodiments, the processing unit is configured to operate the light source at a variable brightness level between a first brightness level and a second brightness level in response to the photosensor output signal, the second brightness level being greater than the first brightness level.

In some embodiments, the processing unit is configured to operate the light source at a maximum brightness level in response to the motion sensor output signal.

These and other aspects of the disclosure will more fully appreciated and understood from the detailed description below.

BRIEF DESCRIPTION OF THE DRAWINGS

FIGS. 6A, 6B, and 6C constitute a schematic or circuit diagram of a control unit in accordance with aspects of the disclosure.

FIGS. 7A, 7B, and 7C constitute a schematic or circuit diagram of a lighting unit in accordance with aspects of the disclosure.

DETAILED DESCRIPTION

Figure 1:
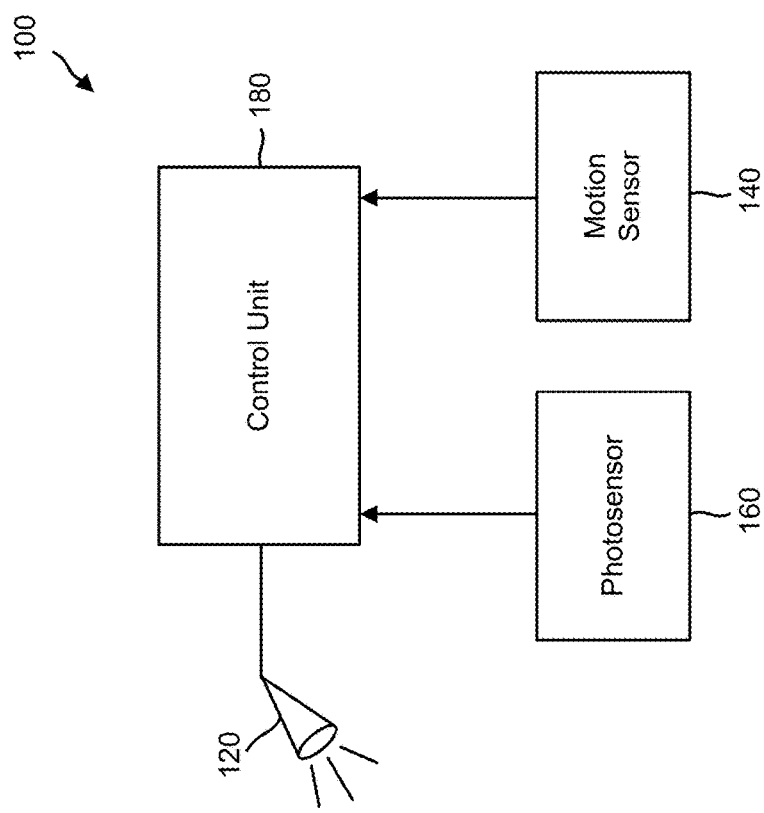
FIG. 1 is a block diagram illustrating an example of a lighting system 100 in accordance with aspects of the disclosure.

FIG. 1 illustrates an example of a lighting system 100 in accordance with aspects of the disclosure. The lighting system 100 includes a light source 120 (which, in various embodiments, is an incandescent or halogen bulb or a light emitting diode secured in a light fixture), a motion sensor 140, a photosensor (or photocell) 160, and a control unit (or controller) 180. The photosensor senses ambient light from the environment, e.g., an area in a vicinity of the lighting system, and generates and communicates a photosensor output signal (or first output signal) indicative of ambient light level to the control unit. The control unit controls operations of the light source based on a value of the photosensor output signal indicative of ambient light level. In some embodiments, the controller commands the light source to turn on or off based on the photosensor output signal. In other embodiments, the control unit operates the light source so as to increase or decrease its brightness level in response to the photosensor output signal. For example, the brightness level may gradually increase from an initial or start-up level to a pre-selected or standby lumen output level (e.g., 25%, 33% or 50% of full brightness) as the ambient light level decreases. Once the brightness level reaches the standby lumen output level, it may remain at this level until an event occurs, for example when motion is detected (as discussed below). On the other hand, as the ambient light level increases, the controller 180 may decrease the brightness level of the light source 120 in proportion to the increasing ambient light level until the light source is turned off. In some embodiments, the brightness level remains at the standby lumen output level for an adjustable standby time period, e.g., by an external switch or other mechanical mechanisms. Upon expiration of the standby time period, the light source may be turned off until an occurrence of an event such as when motion is detected (as discussed herein below). In some embodiments, the standby time period is 4 hours, 8 hours, or spans from dusk to dawn (DTD).

The motion sensor 140, which is optional in some embodiments, is configured to detect movement or motion within an area. When motion is detected, for example, the motion sensor 140 communicates (either by wires or cables, or wirelessly) a motion sensor output signal (or a second output signal). The control unit 180, in some embodiments, causes the light source 120 to increase its brightness to a full brightness level when motion is detected. In some embodiments, when no further motion is detected and after a selectable period of time, the controller 180 directs the light source 120 to reduce its brightness (or lumen output) back to a previous, non-motion activated brightness level. In some embodiments, the selectable period of time is adjustable by a consumer, e.g., by an external switch or other mechanical or electrical mechanisms, within a range of, for example, 1 to 10 minutes (e.g., 1, 5, or 10 minutes). In other embodiments, the selectable period of time is non-adjustable and is set to a fixed time period that may be as short as, for example, 10 seconds. The motion sensor 140, in some embodiments, is a passive sensor such as a Passive Infrared (PIR) motion sensor. In other embodiments, the motion sensor 140 may instead be an active sensor such as a microwave (MW) motion sensor. In yet other embodiments, the motion sensor 140 may have combined features by incorporating features of a passive (e.g., PIR) and an active (e.g., MW) motion sensors.

As an example to demonstrate operation of the lighting system 100, assume that dusk (i.e., when it begins to get dark) begins at 6:00 pm, and ambient light diminishes gradually (e.g., as it gets darker) until 9:00 pm when the night sky is at its darkest (relatively speaking). Likewise, assume dawn starts at 6:00 am, and the sky gets brighter (i.e., ambient light increases) until 9:00 am, at which time the sky has full daylight. At dusk, the light source is turned on, but at an initial, low lumen output, e.g., 10% of its maximum lumen output (or brightness). The lumen output gradually increases as the night gets darker until 9:00 pm, at which time the lumen output of the light source is at a standby lumen output level for a period of maximum darkness (or minimum ambient light). In some embodiments, the standby lumen output level is adjustable, e.g., by an external switch or other mechanical mechanisms, for the convenience of a consumer. The standby lumen output level, for example, may be adjustable between 10% and 100% of the maximum lumen output such as 25%, 33%, 50%, etc. Similarly, at dawn, the lumen output begins to decrease or dim, until, at 9:00 am, it is completely off.

If motion is detected while the light source is operating at any lumen output (i.e., between dusk and dawn), the lumen output of the light source 120 is increased to its maximum (100% brightness) for a predetermined time period, which may be adjustable in some embodiments. If motion is not detected within the predetermined time period, or if the predetermined period of time elapses after the last detection of motion, the lumen output level reverts to the level just prior to the detection of motion, unless the ambient light level has changed in the interim, in which case the lumen output level would be proportional to the changed ambient light level (up to the standby level). In some embodiments, seasonal changes are automatically accommodated, as the brightness of the light source output is based on a relative surrounding ambient light level, as detected and measured by the photosensor 160 and the control unit 180 coupled thereto.

Figure 2:
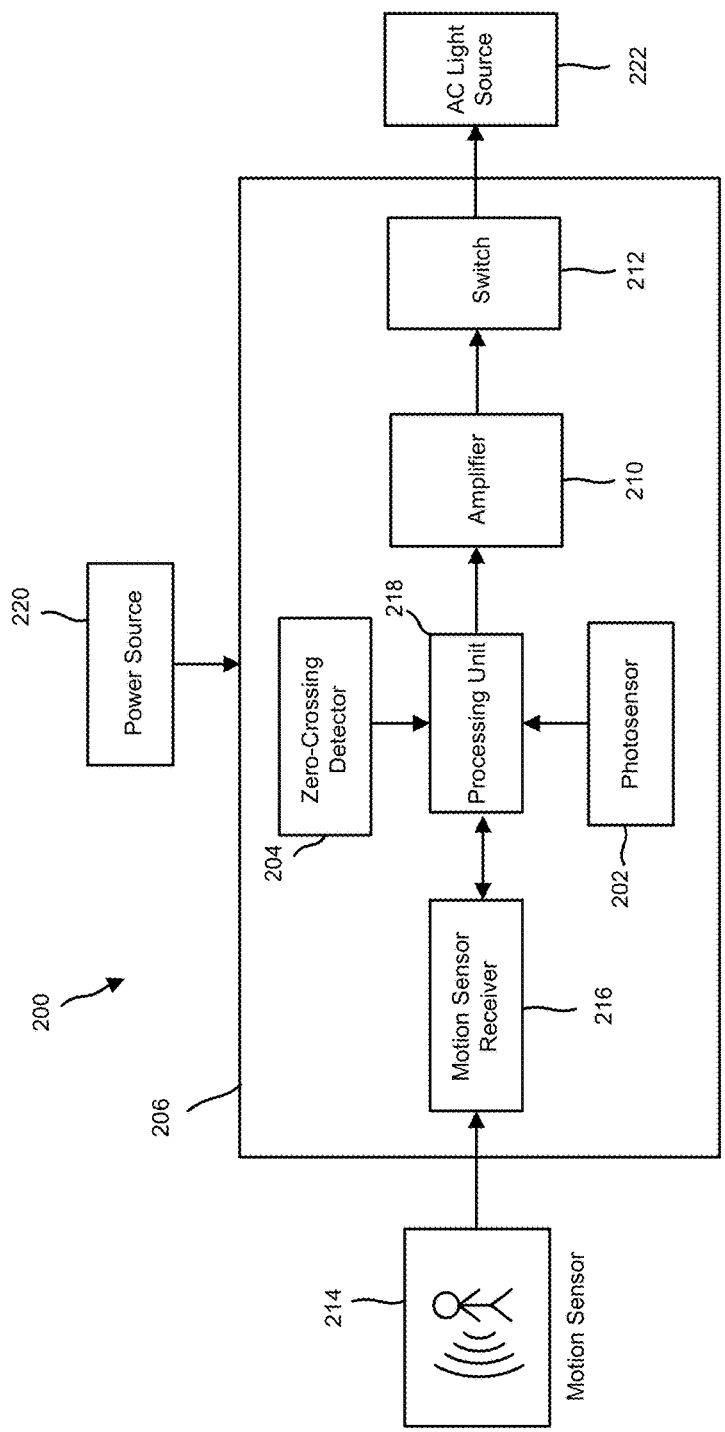
FIG. 2 is a block diagram of a lighting system including an AC-powered light source in accordance with aspects of the disclosure.

FIG. 2 is a block diagram of a lighting system 200 including an AC-powered light source in accordance with aspects of the disclosure. The lighting system 200 includes a power source 220, a control unit 206, a motion sensor 214, and an AC light source 222.

The power source 220 provides electrical power to the control unit, which provides electrical power to the AC light source 222 (e.g., an incandescent, halogen, fluorescent, or dimmable LED bulb). The AC light source 222 in some embodiments may be secured in a light fixture (not shown) that receives AC power from the power source 220. In some embodiments, the AC light source 222 instead may receive power directly from the power source 220. The power source 220 generally provides AC power, for example, from a standard power outlet. In some embodiments, the power source 220 may provide line voltage, e.g., 120V AC power at 60 Hz. Alternatively, in some embodiments, the power source 220 may provide a 220V AC power at 50 Hz, or any other AC power traditionally used in a particular location (e.g., a country).

The motion sensor 214 is configured to detect moving objects within an area. When motion is detected, the motion sensor 214 communicates or provides a motion sensor output signal indicating the detection of motion to the control unit 206. The motion sensor 214, for example, may include a transmission antenna (not shown) for wireless communication of the motion sensor output signal to the control unit 206 at or about a desired frequency. In some embodiments, the motion sensor 214 communicates with the control unit using a wireless interface such as Bluetooth, Wi-Fi, or any other suitable wireless interface.

Although not shown in FIG. 2, and as discussed more fully herein below (e.g., in FIG. 7), in some embodiments, the motion sensor 214 may be a part of a wireless sensor kit that also includes one or more processors or central processing units (CPUs) and components coupled to the processor(s) that interface with external devices for manual selections (e.g., by a consumer) of options. For example, the wireless sensor kit may include a frequency decoder that interfaces with one or more switches (e.g., DIP switches) for selection of the desired frequency and/or a channel for communication between the motion sensor and a motion sensor receiver (as discussed herein below). Accordingly, the desired frequency is adjustable by the consumer so that, for example, interference will not occur with other product(s) within a particular vicinity, such as product(s) from a neighbor. In some embodiments, the wireless sensor kit may also include an instruction decoder that couples to the processor(s) and interfaces with switches (e.g., DIP switches), other mechanical or electrical control mechanisms, or a user interface (UI) for manual selection of a standby lumen output level, enablement of optical or light compensation (i.e., whether to reduce or increase brightness of the AC light source based on the photosensor output signal), a first selectable time period (in which, when no further motion is detected, the processing unit commands the AC light source to reduce its brightness to a previous, non-motion activated brightness level), and a second selectable time period (wherein the brightness level of the AC light source remains at the standby lumen output level prior to turning off until an event occurs, such as when motion is detected). Accordingly, in this case, the wireless sensor kit would communicate the motion sensor output signal to the control unit at or about the desired frequency along with signals indicative of the various selected options provided by the instruction decoder. In some embodiments, the wireless sensor kit communicates with the control unit using a wireless interface such as Bluetooth, Wi-Fi, or any other suitable wireless interface. In some embodiments, the frequency decoder and the instruction decoder may be included in the control unit, for example in a processing unit of the control unit, instead of the wireless sensor kit.

As illustrated in FIG. 2, the control unit 206 includes a motion sensor receiver 216, a photosensor 202, a zero-crossing detector 204, a processing unit 218, an amplifier 210 (in some embodiments), and a switching device 212. Alternatively, the photosensor 202 may be a separate and distinct component from the control unit 206. Although not illustrated in FIG. 2, in some embodiments the control unit may include a conventional AC-to-DC power converter having, for example, a rectifier and a voltage regulator for converting AC power from the power source 220 to DC power and providing proper DC voltage level to various modules or components (e.g., the processing unit, motion sensor receiver, amplifier) within the control unit 206, as would be well-known to those of ordinary skill in the pertinent arts. In some embodiments, the motion sensor receiver 216, the photosensor 202, the zero-crossing detector 204, the processing unit 218, the amplifier 210, and the switching device 212 are implemented on a single circuit board, for example a printed circuit board (PCB), although they may be implemented on different circuit boards.

The motion sensor receiver 216 may include a receiving antenna (not shown) coupled to a receiving integrated circuit (IC) (not shown) for receiving the motion sensor output signal from the motion sensor 214 at or about the desired frequency, as would well-known in the relevant arts. The receiving IC, for example, may demodulate electrical signals received from the receive antenna and provide the processing unit 218 a motion sensor receiver output signal reflecting information of the motion sensor output signal. That is, the motion sensor receiver output signal is indicative of a detection of motion. In some embodiments, the motion sensor receiver output signal has either a "high" or "low" state signal, which indicates the detection of motion. In some embodiments, the motion sensor receiver 216 may be omitted, and the motion sensor 214 may hard-wired couple to the control unit 206 so as to communicate the motion sensor output signal directly to the processing unit 218.

The photosensor 202 senses ambient light and provides a photosensor output signal indicative of an intensity of ambient light or an ambient light level to the processing unit. The photosensor may include a photoresistor, for example a cadmium-sulfide (CdS) photoresistor, photodiode, phototransistor or any other photosensitive element that provides an electrical signal to indicate a level of ambient light, as is well-known in the art.

The zero-crossing detector 204 receives input AC voltage (VAC) from the power source and generates a zero-crossing detection signal. Generally, the zero-crossing detection signal remains at a "low" state, except when the input VAC is about or at zero when the zero-crossing detection signal goes to a "high" state. That is, the zero-crossing detector 204 generates a zero-crossing detection signal having "high" level pulses when the input VAC is about or at 0V in a VAC sine wave.

The processing unit 218 may include one or more processors or central processing units (CPUs) coupled to a memory (e.g., via an internal processor bus) or a microcontroller having one or more processors and a memory, as is well-known in the art. The memory (not shown) may store program instructions to operate the AC light source. The memory may be any conventional non-volatile memory device, such as read-only memory (ROM), flash memory, or ferroelectric random access memory (F-RAM). In some embodiments, the processing unit 218 may further include a frequency decoder and the instruction decoder coupled to the processor(s), with the frequency decoder and instruction decoder performing similar or same functionalities as previously discussed.

In operation, the control unit 206 controls illumination or brightness of the AC light source 222 by way of phase angle control or phase angle adjustment of the VAC sine wave. For example, the processing unit 218 may execute program instructions to generate a trigger signal based on the photosensor output signal and the zero-crossing detection signal for controlling the brightness of the AC light source 222. The trigger signal in some embodiments is time-shifted or time-delayed with respect to the zero-crossing detection signal, wherein the brightness of the AC light source 222 is inversely proportion to the shifted or delayed time. As an example, if the processing unit 218 determines that ambient light is diminishing (i.e., when it begins to get dark) based on the photosensor output signal, the processing unit 218 may generate a trigger signal having a reduced time delay with respect to the zero-crossing detection signal. The trigger signal therefore triggers the input VAC to power the AC light source at a reduced phase angle, thereby allowing more power from the input VAC cycle to be delivered to the AC light source 222. Conversely, if the processing unit determines that ambient light is increasing (i.e., the sky gets brighter) based on the photosensor output signal, the processing unit may generate a trigger signal having an increased time delay with respect to the zero-crossing detection signal. In this case, the trigger signal would trigger the input VAC to power the AC light source 222 at an increased phase angle, thereby allowing less power from the input VAC cycle to be delivered to the AC light source 222.

In some embodiments, the control unit 206, in response to the motion sensor output signal, may generate a trigger signal that causes the AC light source 222 to increase its illumination to a full brightness level. For example, when motion is detected, the processing unit 218 may execute program instructions to ignore the photosensor output signal in controlling illumination of the AC light source 222. Instead, the processing unit 218 controls illumination of the AC light source based solely on the motion sensor receiver output signal. In some embodiments, when motion is detected, the processing unit 218 may execute program instructions to generate a trigger signal with no time shift or delay with respect to the zero-crossing detection signal. In this case, the trigger signal may be similar to or same as the zero-crossing detection signal. Accordingly, the trigger signal would trigger the input VAC to power the AC light source 222, for example, at a zero degree (0°) phase angle, thereby allowing full power (i.e., the entire input VAC cycle) to be delivered to the AC light source. In some embodiments, when motion is detected, the processing unit 218 may simply generate a trigger signal with a "high" state. In some embodiments, when no further motion is detected and after a selectable period of time, the processing unit 218 commands the AC light source 222 to reduce its brightness (or lumen output) back to a previous, non-motion activated brightness level.

In some embodiments, the trigger signal is provided to the amplifier 210 for signal amplification. The amplifier 210 generates an amplified trigger signal to the switching device 212 (e.g., triac, thyristor, silicon controlled rectifier, or any other suitable solid state device) for regulating provision of power to the AC light source 222. If the switching device 212 is a triac, for example, the amplified trigger signal is supplied to a gate of the triac to turn the triac on for a period of time determined by the time shift or delay of the trigger signal relative to the zero-crossing detection signal, thereby creating an "effective duty cycle" of the trigger signal that is determined by the time delay of the trigger signal relative to the zero-crossing detection signal. When turned on, the triac provides a VAC (at a phase angle determined by the trigger signal) to the AC light source 222 to energize the AC light source. The illumination or brightness of the light source 222 is determined by the effective duty cycle of the trigger signal relative to the zero-crossing detection signal. In some embodiments, the amplifier 210 may not be necessary, if, for example, if the system includes a switching device 212 having high sensitivity or a low input impedance. As such, the switching device 212 operates and energizes the AC light source based on the trigger signal received directly from the processing unit 218, instead of an amplified trigger signal. Although the switching device 212 is shown in FIG. 2 as being included within the control unit 206, in some embodiments the switching device 212 may be external to the control unit and may be integrated with the AC light source 222.

Figure 3:
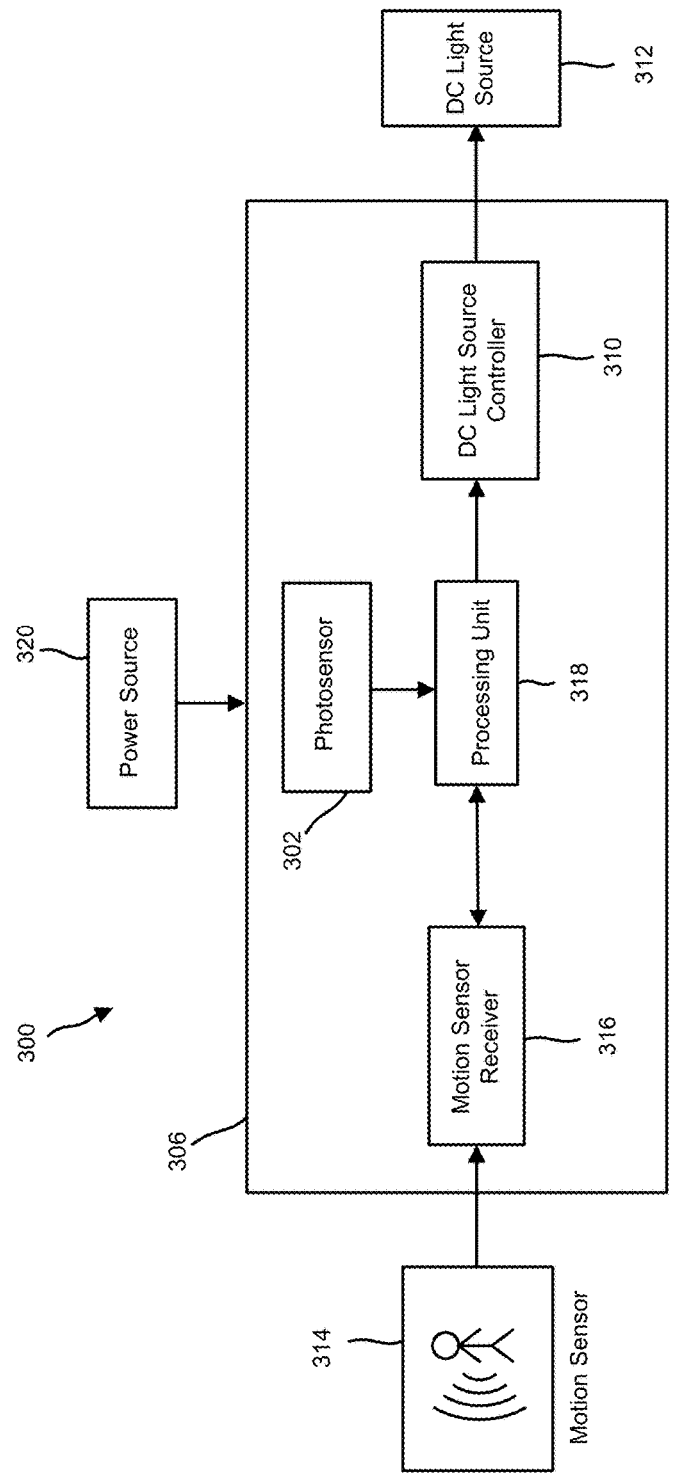
FIG. 3 is a block diagram of a lighting system including a DC light source in accordance with aspects of the disclosure.

FIG. 3 is a block diagram of a lighting system 300 including a DC light source 312 in accordance with aspects of the disclosure. Referring to FIG. 3, the lighting system 300 includes a motion sensor 314, a power source 320, a control unit 306, and the DC light source 312.

As previously discussed, the power source 320 provides electrical power to the control unit 306. The control unit 306 provides electrical power to the DC light source 312 (e.g., LED array).

As with the motion sensor 214 of FIG. 2, the motion sensor 314 is configured to detect moving objects within an area. When motion is detected, the motion sensor communicates or provides a motion sensor output signal to the control unit 306, indicating the detection of motion.

Although not shown in FIG. 3 and as previously discussed with respect to FIG. 2, in some embodiments, the motion sensor may be included in a wireless sensor kit that also includes one or more processors or central processing units (CPUs), and components (e.g., a frequency decoder and an instruction decoder) coupled to the processor(s) that interface with external devices for manual selections of options.

Still referring to FIG. 3, the control unit 306 may advantageously include a motion sensor receiver 316, a photosensor 302, a processing unit 318, and a DC light source controller 310. As discussed above, the photosensor 302 may be a separate unit, not incorporated into the control unit 306. Although not illustrated in FIG. 3, in some embodiments the control unit 306 may include a conventional AC-to-DC power converter having, for example a rectifier and a voltage regulator for converting AC power from the power source to DC power and providing proper DC voltage level to certain components (e.g., the processing unit 318, the motion sensor receiver 316, the DC light source controller 310) within the control unit 306. The motion sensor receiver 316, the photosensor 302, the processing unit 318, and the DC light source controller 310, in some embodiments, may be implemented on a same circuit board (e.g., PCB) although they may be implemented on different circuit boards.

The motion sensor receiver 316, as previously discussed in FIG. 2, may include a receiving antenna (not shown) coupled to a receiving integrated circuit (IC) (not shown) for receiving the motion sensor output signal from the motion sensor 314 at or about the desired frequency. As also previously discussed in FIG. 2, in some embodiments the motion sensor receiver 316 may be omitted and the motion sensor may communicate the motion sensor output signal directly to the processing unit, either by wires or cables, or wirelessly.

The photosensor 302, as also previously discussed, senses ambient light and provides a photosensor output signal indicative of an intensity of ambient light or an ambient light level to the processing unit 318. The photosensor 302 may include a photoresistor (not shown), for example a cadmium-sulfide (CdS) photoresistor, photodiode, phototransistor or any other photosensitive element that provides an electrical signal to indicate a level of ambient light.

The processing unit 318 may include one or more processors or central processing units (CPUs) coupled to a memory (e.g., via an internal processor bus) or a microcontroller having one or more processors and a memory. The memory may store program instructions to operate the DC light source 312. In some embodiments, the memory is a non-volatile memory such as read-only memory (ROM), flash memory, or ferroelectric random access memory (F-RAM). In some embodiments, the processing unit 318 may further include the frequency decoder and the instruction decoder coupled to the processor(s), with the frequency decoder and instruction decoder performing similar or same functionalities as previously discussed.

In operation, the control unit 306 may control illumination or brightness of the DC light source 312 by way of pulse width modulation (PWM) or pulse frequency modulation (PFM). For example, the processing unit 318 may execute program instructions to generate a reference voltage based on the photosensor output signal, and provide the reference voltage to the DC light source controller 310. The DC light source controller 310 may include one or more PWM generators that generally produce a series of pulses to control the brightness of the DC light source based on a frequency and a duty cycle of the PWM generators, for example, based on the reference voltage from the processing unit 318. As an example, if the processing unit 318 determines that ambient light is diminishing based on the photosensor output signal, the processing unit 318 may increase the reference voltage, thereby causing the DC light source controller 310 to output PWM signals having pulses with increased duty cycle. As such, the brightness of the DC light source 312 is increased. On the other hand, if the processing unit 318 determines that ambient light is increasing based on the photosensor output signal, the processing unit 318 may reduce the reference voltage, thereby causing the DC light source controller 310 to output PWM signals having pulses with reduced duty cycle. In this case, the brightness of the DC light source 312 is also reduced.

In some embodiments, the control unit 306, in response to the motion sensor output signal, may generate a reference voltage to increase illumination of the DC light source 312 to a full brightness level. For example, when motion is detected, the processing unit 318 may execute program instructions to generate a reference voltage so as to cause the DC light source controller 310 to output PWM signals having pulses with 100% duty cycle. Accordingly, the DC light source would operate at full brightness. In some embodiments, when no further motion is detected and after a selectable period of time, the processing unit 318 commands the DC light source 312 to reduce its brightness (or lumen output) back to a previous, non-motion activated brightness level. In doing so, the processing unit 318 may generate a reference voltage so as to cause the DC light source controller 310 to output PWM signals having pulses with a fraction of the full or 100% duty cycle.

Figure 4:
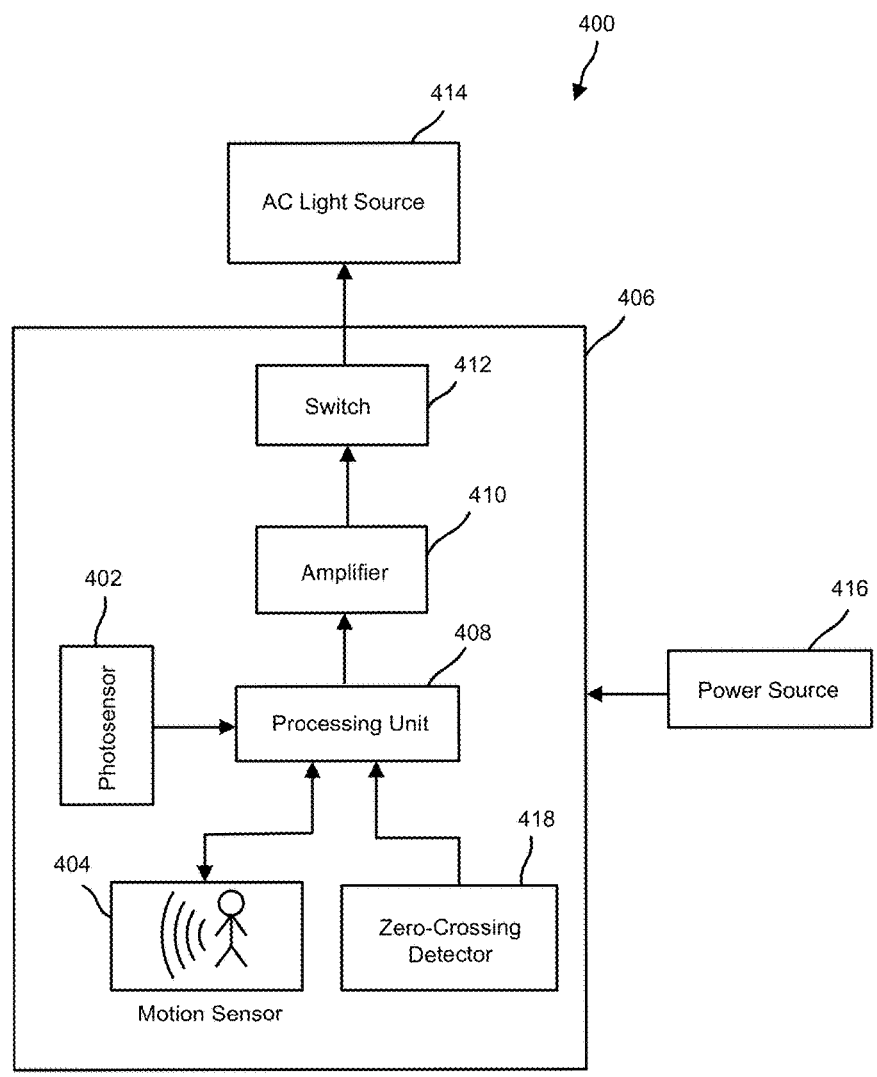
FIG. 4 is a block diagram of another lighting system including an AC-powered light source in accordance with aspects of the disclosure.

FIG. 4 is a block diagram of another lighting system 400 including an AC-powered light source in accordance with aspects of the disclosure. Referring to FIG. 4, a lighting system 400 includes a power source 416, a light fixture 406 (e.g., a traditional light fixture in an existing home), and an AC light source 414.

The power source 416, as previously discussed, provides electrical power to the light fixture 406, which provides electrical power to the AC light source 414 (e.g., incandescent, halogen, or dimmable LED bulb).

As illustrated in FIG. 4, the light fixture 406 advantageously includes a motion sensor 404, a photosensor 402, a zero-crossing detector 418, a processing unit 408, an amplifier 410 (in some embodiments), and a switching device 412. In some embodiments, the motion sensor 404, the photosensor 402, the zero-crossing detector 418, the processing unit 408, the amplifier 410 (if present), and the switching device 412 may be integrated within the light fixture 406, for example on a PCB.

The motion sensor 404 (e.g., PR or MW motion sensor) may be coupled to the processing unit 408 and configured to detect moving objects within an area. When motion is detected, the motion sensor 404 communicates or provides a motion sensor output signal indicating the detection of motion to the processing unit 408. In some embodiments, the motion sensor output signal is either a "high" or "low" state signal, which indicates the detection of motion.

The photosensor 402, which, in some embodiments, is similar to or the same as the photosensors 202 and 302 of FIGS. 2 and 3, senses ambient light and provides a photosensor output signal indicative of an intensity of ambient light or an ambient light level to the processing unit 408. The photosensor 402 may include a photoresistor (e.g., a CdS photoresistor), photodiode, phototransistor or any other photosensitive element that provides an electrical signal to indicate a level of ambient light, as is well-known in the art.

The zero-crossing detector 418, similar to the zero-crossing detector 204 of FIG. 2, receives input AC voltage (VAC) from the power source 416 and generates a zero-crossing detection signal. For example, the zero-crossing detector 418 may generate a zero-crossing detection signal having "high" level pulses when the input VAC is about or at 0V in a VAC sine wave.

The processing unit 408 may include one or more processors or central processing units (CPUs) coupled to a memory (e.g., via an internal processor bus) or a microcontroller having one or more processors and a memory. The memory (e.g., ROM, flash memory, or F-RAM) may store program instructions to operate the AC light source 414. In some embodiments, the processing unit 408 may further include an instruction decoder that interfaces with switches (e.g., DIP switches), other mechanical or electrical control mechanisms, or a UI for manual selection of a standby lumen output level, enablement of optical or light compensation (i.e., whether to reduce or increase brightness of the AC light source 414 based on the photosensor output signal), a first selectable time period (in which, when no further motion is detected, the processing unit commands the AC light source 414 to reduce its brightness to a previous, non-motion activated brightness level), and a second selectable time period (wherein the brightness level of the AC light source 414 remains at the standby lumen output level prior to turning off until an event occurs, such as when motion is detected).

In operation, the light fixture 406 controls illumination or brightness of the AC light source 414 by way of phase angle control or phase angle adjustment of the VAC sine wave (as previously discussed). The processing unit 408, for example, may execute program instructions to generate a trigger signal based on the photosensor output signal and the zero-crossing detection signal for controlling the brightness of the AC light source 414. The trigger signal in some embodiments is time-shifted or time-delayed with respect to the zero-crossing detection signal, wherein the brightness of the AC light source 414 is inversely proportion to the shifted or delayed time.

In some embodiments, the processing unit 408, in response to the motion sensor output signal, may generate a trigger signal that causes the AC light source 414 to increase its illumination to a full brightness level. For example, when motion is detected, the processing unit 408 may execute program instructions to control illumination of the AC light source 414 based on the motion sensor output signal. In some embodiments, when motion is detected, the processing unit 408 may execute program instructions to generate a trigger signal with no time shift or delay with respect to the zero-crossing detection signal. In this case, the trigger signal may be similar to or same as the zero-crossing detection signal. Accordingly, the trigger signal would trigger the input VAC to power the AC light source 414, for example, at a zero degree (0°) phase angle, thereby allowing full power (i.e., the entire input VAC cycle) to be delivered to the AC light source 414. In some embodiments, when motion is detected, the processing unit 408 may simply generate a trigger signal with a "high" state. In some embodiments, when no further motion is detected and after a selectable period of time, the processing unit 408 commands the AC light source 414 to reduce its brightness (or lumen output) back to a previous, non-motion activated brightness level.

In some embodiments, the trigger signal is provided to the amplifier 410 for signal amplification. The amplifier generates an amplified trigger signal to the switching device 412 (e.g., triac, thyristor, silicon controlled rectifier, or any other suitable solid state device) for regulating provision of power to the AC light source 414, as previously discussed. In some embodiments, the amplifier is not necessary, if, for example, the light fixture 406 includes a switching device 412 having high sensitivity or a low input impedance. As such, the switching device 412 operates and energizes the AC light source 414 based on a trigger signal directly received from the processing unit 408, instead of the amplified trigger signal, as discussed above.

In some embodiments the motion sensor 404, the photosensor 402, the zero-crossing detector 418, the processing unit 408, the amplifier 410 (if present), and the switching device 412 may be included in a lighting unit having a base that adapts to a matching socket in a light system or fixture instead of being integrated in the light fixture 406. The base, for example, may be a base with a spiral groove (e.g., Edison screw such as E10, E14, or E27) or a twist-lock mechanism ("bayonet") configured to match a receiving socket in a light system or fixture. In some embodiments, the lighting unit may be implemented or secured in a traditional light fixture, including general (A series), reflector (R series), bulged reflector (BR series), parabolic aluminized reflector (PAR series), globe (G series), tube or any other traditional designs (such as BA, CA, ER, F, FL, P, PR, PL, PS series). Accordingly, the lighting unit may be installed in a lighting system or fixture by replacing a traditional light bulb with the lighting unit without replacing any wiring in the light system or fixture.

Figure 5:
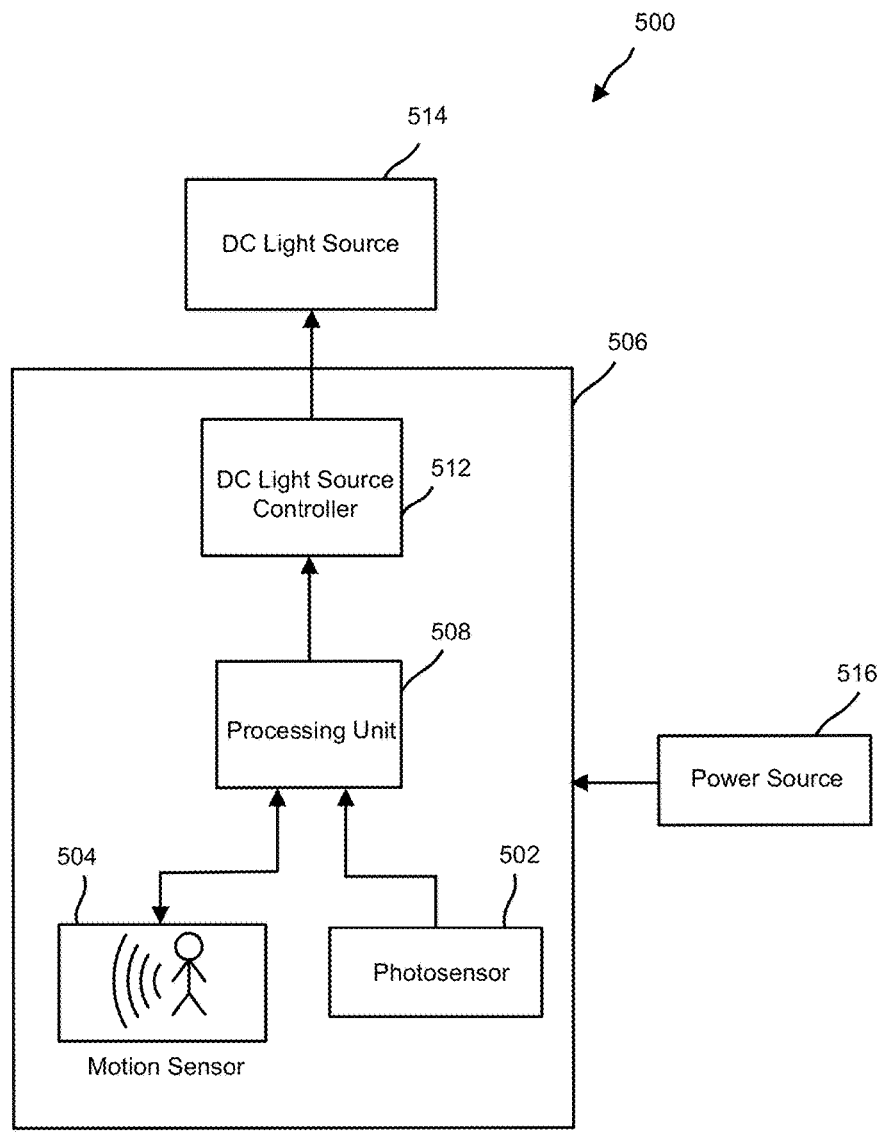
FIG. 5 is a block diagram of another lighting system including a DC-powered light source in accordance with aspects of the disclosure.

FIG. 5 is a block diagram of another lighting system 500 including a DC-powered light source in accordance with aspects of the disclosure. Referring to FIG. 5, the lighting system 500 includes a power source 516, a light fixture 506, and a DC light source 514.

The power source 516, as previously discussed, provides electrical power to the light fixture 506, which provides electrical power to the DC light source 514 (e.g., LED array).

As illustrated in FIG. 5, the light fixture 506 advantageously includes a motion sensor 504, a photosensor 502, a processing unit 508, and a DC light source controller 512. In some embodiments, the motion sensor 504, the photosensor 502, the processing unit 508, and the DC light source controller 512 may be integrated within the light fixture 506, for example on a PCB. In some embodiments, the DC light source 514 may also be included and integrated within the light fixture 514, for example on the PCB. In other embodiments the motion sensor 504, the photosensor 502, the processing unit 508, the DC light source controller 512, and the DC light source 514 may instead be included in a lighting unit having a base that adapts to a matching socket in a light system or fixture, as previously discussed.

As with the motion sensor 404 of FIG. 4, the motion sensor 504 may be coupled to the processing unit and configured to detect moving objects within an area. When motion is detected, the motion sensor 504 communicates or provides a motion sensor output signal indicating the detection of motion to the processing unit 508. As with the photosensor 402 of FIG. 4, the photosensor 502 senses ambient light and provides a photosensor output signal indicative of an intensity of ambient light or an ambient light level to the processing unit 508.

The processing unit 508 may include one or more processors or central processing units (CPUs) coupled to a memory or a microcontroller having one or more processors and a memory. The memory may store program instructions to operate the DC light source. In some embodiments, the processing unit 508 may further include an instruction decoder coupled to the processor(s), as previously discussed.

In operation, the light fixture 506 may control illumination or brightness of the DC light source 514 by way of pulse width modulation (PWM) or pulse frequency modulation (PFM), as previously discussed. The processing unit 508, for example, may execute program instructions to generate a reference voltage based on the photosensor output signal, and provide the reference voltage to the DC light source controller 512. The DC light source controller 512 may include one or more PWM generators that generally produce a series of pulses to control the brightness of the DC light source based on a frequency and a duty cycle of the PWM generators, for example, based on the reference voltage from the processing unit 508.

In some embodiments, the processing unit 508, in response to the motion sensor output signal, may generate a reference voltage to increase illumination of the DC light source 514 to a full brightness level. For example, when motion is detected, the processing unit 508 may execute program instructions to control illumination of the DC light source 514 based solely on the motion sensor output signal. In some embodiments, when motion is detected, the processing unit 508 may execute program instructions to generate a reference voltage so as to cause the DC light source controller 512 to output PWM signals having pulses with 100% duty cycle. Accordingly, the DC light source 514 would operate at 100% or full brightness. In some embodiments, when no further motion is detected and after a selectable period of time, the processing unit 508 commands the DC light source 514 to reduce its brightness (or lumen output) back to a previous, non-motion activated brightness level. In doing so, the processing unit 508 may generate a reference voltage so as to cause the DC light source controller 512 to output PWM signals having pulses with a fraction of the full or 100% duty cycle.

FIGS. 6A, 6B, and 6C constitute a schematic or circuit diagram of a control unit in accordance with aspects of an exemplary embodiment of the disclosure. It will be appreciated that a control unit in accordance with this disclosure may be implemented by way of a number of functionally equivalent embodiments that would readily suggest themselves to persons of ordinary skill in the art. The embodiment described below and illustrated in the drawings will therefore be considered representative of such equivalent embodiments, and not exclusive of any of them.

The control unit (which may, for example, be the control unit 180 of FIG. 1 and/or the control unit 206 of FIG. 2) may include a zero-crossing detector 600, an amplifier or amplifying unit 620, a motion sensor receiver 650, and a processing unit 680. In some embodiments, the zero-crossing detector 600, the amplifier 620, the motion sensor receiver 650, and the processing unit 680 are implemented on a single circuit board (e.g., a PCB) or on different circuit boards.

Turning to FIG. 6A, the zero-crossing detector 600 includes a first RC circuit (or RC filter) 603, a first rectifier 605, and a first optocoupler (or optoisolator) 607. The first RC circuit 603 is formed with a first capacitor 602 connected in parallel with first and second series-connected resistors 604a, 604b, respectively. The first rectifier 605 (e.g., a full wave rectifier or bridge rectifier) includes four diodes connected in a closed loop "bridge" configuration. The first optocoupler 607 includes a light-emitting element 611 (e.g., a LED) and a light-sensitive element 613 (e.g., a phototransistor).

A first node of the first RC circuit 603 (e.g., a first terminal of the first capacitor 602 and the first resistor 604a) is coupled to a positive side of an input VAC (which may be referred to as 120V-L) through a fuse 601. A second node of the first RC circuit 603 (e.g., a second terminal of the first capacitor 602 and the second resistor 604b) is connected to a negative side of the input VAC (which may be referred to as 120V-N) and coupled to a first node of the first rectifier 605 (e.g., a negative AC node) by way of series-connected third, fourth, and fifth resistors 606a, 606b, 606c, respectively. A second node of the first rectifier 605 (e.g., a high voltage source or VDC node) is connected to a first terminal of the first optocoupler 607, which may be a positive terminal (or anode) of the light-emitting element 611. A third node of the first rectifier 605 (e.g., a low voltage source or ground) is connected to a second terminal of the first optocoupler 607, which may be a negative terminal (or cathode) of the light-emitting element 611. A fourth node of the first rectifier 605 (e.g., positive AC node) is also connected to the first node of the RC circuit 603, thereby coupling to the positive terminal of the input VAC.

The first optocoupler 607 further includes a third terminal (e.g., a collector of the light-sensitive element 613) connected to a low voltage source (e.g., ground), and a fourth terminal of the first optocoupler 607 (e.g., an emitter of the light-sensitive element 613) connected to a first terminal of an output resistor 608 and a first terminal of an output capacitor 609, with the output resistor 608 having a second terminal connected to a high voltage source (e.g., 5 VDC) and the output capacitor 609 having a second terminal connected to the low voltage source (e.g., ground).

In operation, the first RC circuit or RC filter 603 receives and filters input AC, and provides a filtered AC to the rectifier. The first rectifier 605 serves to convert AC to DC. For example, the first rectifier 605 may convert both positive and negative AC half-cycles to positive DC cycles. The first rectifier 605 drives the first optocoupler 607 by providing the DC cycles to the light-emitting element 611 of the first optocoupler 607 to produce light (e.g., at every DC cycle) which may be detected by the light-sensitive element 613, which produces an output signal to the output resistor 608 and the output capacitor 609. In some embodiments, the output signal may serve as a zero-crossing detection signal as previously discussed, and as further discussed below.

As illustrated in FIG. 6A, the amplifier 620, in some embodiments, includes an amplifier optocoupler 621, a second RC circuit or filter 627, a first amplifier rectifier 631, and a second amplifier rectifier 639. The amplifier optocoupler 621 includes a light-emitting element 622 (e.g., LED) coupled to a light-sensitive element 624 (e.g., phototransistor). The second RC circuit 627 includes a first capacitor 628 connected in parallel with a first resistor 630. Each of the first and second amplifier rectifiers 631, 639 includes four diodes connected in a closed loop "bridge" configuration.

A first terminal of the amplifier optocoupler 621 (e.g., a positive terminal or anode of the light-emitting element 622) is connected to a high voltage source (e.g., 5 VDC) and a second terminal of the amplifier optocoupler 621 (e.g., a negative terminal or cathode of the light-emitting element 622) is coupled to a trigger terminal, for example a trigger terminal or pin from the processing unit (as discussed below), through a second resistor 629. A third terminal of the amplifier optocoupler 621 (e.g., a collector of the light-sensitive element 624) is connected to a first terminal (e.g., a base) of a transistor 647 (e.g., BJT), a first end of a third resistor 645, and a first end of a first diode 643. As further shown in FIG. 6A, a first end of a second diode 623 is coupled to the negative terminal of the input VAC through fourth, fifth, and sixth series-connected resistors 625a, 625b, 625c, respectively, with a second end of the second diode 623 connected to a fourth terminal of the amplifier optocoupler 621 (e.g., an emitter of the light-sensitive element 624).

As also illustrated in FIG. 6A, a first node of the second RC circuit 627 is connected to the negative terminal of the input AC, with a second node of the second RC circuit 627 connected to a first node of the first amplifier rectifier 631 (e.g., a negative AC node). A second node of the first amplifier rectifier 631 (e.g., a high voltage source or VDC node) is connected to a first end of a first capacitor 633a, and, through a seventh resistor 648, to respective first ends of second, third, fourth, and fifth capacitors 633b, 633c, 633d, 633e, and to first ends of an eighth resistor 635 and a third diode 637, with second ends of the first, second, third, fourth, and fifth capacitors 633a-e and second ends of the eighth resistor 635 and the third diode 637 connected to a low voltage source (e.g., ground). The first ends of the second, third, fourth, and fifth capacitors 633b-e and the first ends of the eighth resistor 635 and the third diode 637 are also connected to the high voltage source (e.g., 5 VDC). Accordingly, the first through fifth capacitors 633a-e are connected in parallel with the eighth resistor 635 and the third diode 637 between the high voltage source and the low voltage source. Moreover, the first amplifier rectifier 631 also includes a third node (e.g., a positive AC node) connected to the positive terminal of the input VAC and a fourth node (e.g., a low voltage source node) connected to the low voltage source (e.g., ground).

Still referring to the amplifier 620, a second end of the second diode 623 is connected to a first end of a sixth capacitor 649, with a second end of the sixth capacitor 649 connecting to a second terminal of the transistor 647 (e.g., a collector). The transistor 647 also includes a third terminal (e.g., an emitter) connected to a node between a second end of the first diode 643 and a first end of a switching element 641 (e.g., MOSFET), with the first diode 643 and the switching element 641 coupled in series.

Still referring to FIG. 6A, the second amplifier rectifier 639 includes a first node connected to the positive terminal of the input VAC. A second node of the second amplifier rectifier 639 is connected to an input (e.g., a gate) of the switching element 641, with the switching element having a second terminal connected to a third node of the second amplifier rectifier 639 (e.g., the low voltage node or ground). The third node of the second amplifier rectifier 639 is also connected to a second end of the third resistor 645, a second end of the sixth capacitor 649, and a first end of a fourth diode 644, with the fourth diode 644 having a second end connected to the fourth terminal of the amplifier optocoupler 621. The second amplifier rectifier 639 further includes a fourth node that serves as an output terminal for the amplifier 620.

In operation, the amplifier 620 receives input (e.g., a trigger signal as previously discussed) from the trigger terminal and performs amplification functions using the circuit as described. After amplification of the input, the amplifier provides an amplified signal (e.g., an amplified trigger signal) to the output terminal (i.e., the fourth node of the third rectifier 639).

Turning to FIG. 6B, the motion sensor receiver includes a receiver integrated circuit (IC) 651. In some embodiments, the receiver IC 651 is formed using transistors (e.g., BJTs, MOSFETs). The receiver IC 651 includes various terminals or pins that include a REFOSC pin connected to a first end of an oscillator 653, a CAGC pin connected to a first end of a first capacitor 657, a WAKEB pin connected to a first end of a first resistor 655, and a DO pin for providing a motion sensor receiver output signal (which may be referred to as "RF signal"). As shown in FIG. 6B, each of the oscillator 653, the first capacitor 657, and the first resistor 655 includes a second end connected to the low voltage source (e.g., ground). In some embodiments the oscillator 653 may serve to stabilize frequencies for the motion sensor receiver.

In FIG. 6B, the receiver IC 651 further includes a VSS pin connected to the low voltage source, and an ANT pin connected to a first end of a second capacitor 663 and a first end of a first inductor 661, with the first inductor 661 having a second end connected to the low voltage source. A second end of the second capacitor 663 is connected to an antenna 669 and first ends of a third capacitor 665 and a second inductor 667, with the third capacitor 665 and the second inductor 667 having second ends connected to the low voltage source. As further shown in FIG. 6B, the receiver IC 651 includes a VDD pin connected to a high voltage source (e.g., 5 VDC) and to first ends of a fourth capacitor 671 and a fifth capacitor 673, with the fourth and fifth capacitors having second ends connected to the low voltage source. The receiver IC 651 also includes a CTH pin connected to a first end of a sixth capacitor 675, with the sixth capacitor having a second end connected to the low voltage source.

Turning to FIG. 6C, the processing unit 680 includes a memory or storage device 681, a processor or CPU 683, and a frequency decoder 685. In some embodiments, the memory 681, the processor 683, and the frequency decoder 685 are formed using transistors (e.g., BJTs, MOSFETs). The memory, processor, and frequency decoder may be implemented on a single circuit board (e.g., a PCB) or on different circuit boards.

As shown in FIG. 6C, the memory 681 includes A0, A1, A2 and VSS pins connected to the low voltage source (e.g., ground). The memory 681 further includes a VCC pin connected to the high voltage source (e.g., 5 VDC), a WP pin connected to the low voltage source, and SCL and SDA pins connected to the processor 683, as discussed below.

The frequency decoder 685 includes pins 7-12 connected to the low voltage source, and pins 1-6 (which may be referred to as "code6," "code5," "code4," "code3," "code2," and "code1," respectively) connected to the processor 683, as discussed below.

The processor 683 includes a VDD pin connected to the high voltage source and to a resistor 687, with the resistor and a photosensor 691 (e.g., a CdS photoresistor) connecting in series between the high voltage source and the low voltage source. The processor 683 also includes a PA7 pin connected to the SCL pin of the memory 681, a PA6 pin connected to the SDA pin of the memory 681, a PA5 pin (which may be open or non-connected), a PB7/AD7 pin connected to a node between the resistor 687 and the photosensor 691, a PB4/AD4 pin connected to the second end of the optocoupler 621 of the amplifier 620 as previously discussed (which may be referred to as "Trigger"), a PB5/AD5 pin connected to the DO pin of the receiver IC 651 of the motion sensor receiver 650, and a PB6/AD6 pin (which may be open or non-connected).

As further shown in FIG. 6C, the processor 683 also includes a GND pin connected to the low voltage source, a PA0/AD10 pin connected to the fourth end of the optocoupler 607 of the zero-crossing detector 600, and pins PA4/AD9, PA3/AD8, PB3/AD3, PB1/AD1, PB0/AD0 and PB2/AD2 connected to the pins 1-6 of the frequency decoder 685, respectively. Although the memory 681 and the frequency decoder 685 are shown in FIG. 6C as including in the processing unit 680, in some embodiments, the memory and frequency decoder may be external to the processing unit.

In operation, the processor 683 may execute program instructions stored in the memory 681 to generate a trigger signal (e.g., through the PB4/AD4 pin) based on a photosensor output signal received from the PB7/AD7 pin and a zero-crossing detection signal received from the PA0/AD10 pin for controlling the brightness of a light source (e.g., an AC light source). The trigger signal in some embodiments is time-shifted or time-delayed with respect to the zero-crossing detection signal, wherein the brightness of the light source is inversely proportion to the shifted or delayed time. The trigger signal is provided to the amplifier 620 (e.g., to the second end of the amplifier optocoupler 621) for amplification, thereby providing an amplified trigger signal to the output terminal of the amplifier 620 (i.e., the fourth node of the second amplifier rectifier 639).

In some embodiments, the motion sensor receiver 650 receives a motion sensor output signal from a motion sensor or wireless sensor kit (e.g., by way of the antenna) at or about the desired frequency and provides the motion sensor receiver output signal based on the motion sensor output signal. The desired frequency, for example, may be provided by the frequency decoder 685, and may be selected by way of one or more switches (e.g., DIP switches, not shown) coupled to the frequency decoder. The processor 683 may control illumination of the light source based on the motion sensor receiver output signal received from, for example, the DO pin of the motion sensor receiver 650. In some embodiments, when motion is detected (as indicated by the motion sensor receiver output signal), the processor 683 may execute program instructions stored in the memory 681 to generate the trigger signal with no time shift or delay with respect to the zero-crossing detection signal. In this case, the trigger signal may be similar to or the same as the zero-crossing detection signal. Again, the trigger signal is provided to the amplifier 620 for amplification of the trigger signal, thereby providing an amplified trigger signal to the output terminal of the amplifier.

FIGS. 7A, 7B, and 7C constitute a schematic or circuit diagram of an exemplary embodiment of a wireless sensor kit in accordance with aspects of the disclosure. The embodiment described below and shown in the drawings is merely representative of various functionally equivalent embodiments that may suggest themselves to persons having ordinary skill in the art, and is not meant to exclude any such embodiments.

The exemplary wireless sensor kit shown in FIGS. 7A-C includes a sensing unit 700, a wireless transmitter 730, and a processing unit 750, which may be implemented on a single circuit board (e.g., PCB) or on different circuit boards. The sensing unit 700 (shown in FIG. 7A) includes a first resistor 703 and a first capacitor 704 connected in series between a high voltage source (e.g., VCC) and a low voltage source (e.g., ground). A motion sensor 702 (e.g., PIR or MW motion sensor) detects moving objects within an area or vicinity. The motion sensor 702 includes a pin 1 connected to a node between the first resistor 703 and the first capacitor 704, for example, for providing input voltage to the sensor. A first end of a second capacitor 706 is also connected to the node between the first resistor 703 and first capacitor 704, with the second capacitor 706 having a second end connected to the low voltage source. The motion sensor 702 further includes a second pin 2 connected to first ends of a third capacitor 708 and a second resistor 705, with the third capacitor 708 and the second resistor 705 including second ends connected to the low voltage source, and a third pin 3 also connected to the low voltage source. The second pin 2, in some embodiments, may provide a motion sensor output signal (e.g., a "high" state signal) when motion is detected.

The sensing unit 700 further includes a signal amplifier 701, which is preferably an integrated circuit (IC), but which may also be implemented with discrete solid state components, as is well-known in the art. The signal amplifier 701, when embodied, for example, as an IC, includes a plurality of terminals or pins, including a VDD pin connected to the high voltage source, a RR2 pin coupled to the high voltage source through a third resistor 707, a 1 IN+ pin connected to the second pin 2 of the sensor 702, and a 2 IN+ pin connected to a first end of a fourth resistor 709, with the fourth resistor having a second end connected to a first end of a fourth capacitor 710, and the fourth capacitor having a second end connected to the low voltage source. The 2 IN+ pin is also connected to first ends of a fifth resistor 711 and a fifth capacitor 712, with the fifth resistor and fifth capacitor having second ends connected to a 1 OUT pin of the signal amplifier 701.

As further illustrated in FIG. 7A, a sixth capacitor 714, a sixth resistor 713, and a seventh resistor 715 are connected in series between the 1 OUT pin and a 2 OUT pin of the signal amplifier 701. A 2 IN pin of the signal amplifier 701 is connected to a node between the sixth resistor 713 and the seventh resistor 715 and a first end of a seventh capacitor 716, with the seventh capacitor 716 having a second end connected to the 2 OUT pin. In addition, the signal amplifier 701 includes VSS and A pins connected to the low voltage source, and a VC pin coupled to the low voltage source through an eighth resistor 717.

As also illustrated in FIG. 7A, the sensing unit 700 includes a ninth resistor 719 and an eighth capacitor 718 connected in series between a RR2 pin of the signal amplifier 701 and the low voltage source, with a first RC1 pin of the signal amplifier 701 connecting to a node between the ninth resistor 719 and the eight capacitor 718. The sensing unit 700 further includes a tenth resistor 721 and a ninth capacitor 720 connected in series between a RR1 pin of the signal amplifier and the low voltage source, with a second RC1 pin of the signal amplifier 701 connected to a node between the tenth resistor 721 and the ninth capacitor 720. The signal amplifier preferably includes an OV pin (which may be referred to as "induction input") that provides an amplified motion sensor output signal, and a VRF/RESET pin that connects to the high voltage source.

In operation, the signal amplifier 701 may receive the motion sensor output signal via the 1 IN+ pin from the motion sensor when motion is detected. The signal amplifier 701 amplifies the motion sensor output signal and provides the amplified motion sensor output signal via the OV pin. The amplified motion sensor output signal may be provided to a processor for processing, as discussed below.

Turning to FIG. 7B, the wireless transmitter includes a first resistor 731 and a light emitting diode (LED) 739 connected in series between a first end of a second resistor 733 and the low voltage source. A first terminal (e.g., a base) of a transistor 741 (e.g., BJT) is connected to a second end of the second resistor 733, a first end of an oscillator 743, a first end of a first capacitor 732 (with a second end of the first capacitor 732 connecting to the low voltage source), and a first end of a second capacitor 738. The transistor 741 generally amplifies signals, for example radio-frequency (RF) signals, provided to the oscillator 743. The oscillator produces oscillating signals having a resonant frequency determined, for example, by a quartz crystal (not shown) in (or operatively associated with) the oscillator 743.

A second terminal (e.g., collector) of the transistor 741 is connected to second ends of the second capacitor 738 and the oscillator 743. The second end of the oscillator 743 is also connected to one end of an inductor 745, with a second end of the inductor connected to the high voltage source. In some embodiments, the inductor 745 serves as an antenna for transmitting signals for the wireless transmitter. In some embodiments, an antenna (not shown) coupled to the transistor 741 may transmit such signals.

As shown in FIG. 7B, a third capacitor 734 and a fourth capacitor 736 are connected in series between the second terminal of the transistor 741 and the low voltage source. A third terminal of the transistor 741 (e.g., emitter) is coupled to the low voltage source through a third resistor 735, and connected to a node between the third and fourth capacitors 734, 736.

Turning to FIG. 7C, the processing unit 750 includes a processor or CPU 751, a frequency decoder 753, and an instruction decoder 755. Although FIG. 7C shows the frequency decoder and instruction decoder as included within the processing unit 750, in some embodiments the frequency decoder and instruction decoder are external to the processing unit.

The frequency decoder includes pins 7-12 connected to the low voltage source, and pins 1-6 (which may be referred to as "code6," "code5," "code4," "code3," "code2" and "code1" respectively) connected to the processor 751, as discussed below. The instruction decoder includes pins 5-8 connected to the low voltage source, and pins 1-4 (which may be referred to as "Time selection1," "Time selection2," "Brightness selection" and "Optical compensation" respectively) connected to the processor 751, as discussed below. In some embodiments, the instruction decoder 755 may have a plurality of pins or terminals (numbered 1-4 in FIG. 7C), each of which may be coupled to a manual control for input of a selectable operational parameter. For example, pin 3 may be coupled to one or more switches (e.g., DIP switches) or other mechanical/electrical mechanisms (not shown) for manual selection (e.g., by a consumer) of a standby lumen output level; pin 4 may provide enablement of optical or light compensation (as described below); pin 1 may provide input of a first selectable time period, in which, when no further motion is detected, the processing unit 751 commands a light source to reduce its brightness to a previous, non-motion activated brightness level; and pin 2 may provide input of a second selectable time period, in which the brightness level of the light source remains at the standby lumen output level prior to turning off until an event occurs (such as when motion is detected).

As shown in FIG. 7C, the processor 751 includes a VDD pin connected to the high voltage source (e.g., VCC) and to a first end of a fourth resistor 757 connected in series with a photosensor 763 (e.g., a CdS photoresistor) between the high voltage source and the low voltage source. The processor 751 further includes a PA7 pin connected to the pin 1 of the instruction decoder 755, a PA6 pin connected to the pin 2 of the instruction decoder, a PA5 pin (which may be open or non-connected), a PB7/AD7 pin connected to a node between the fourth resistor 757 and the photosensor 763 and coupled to the low voltage source through a fifth capacitor 760, a PB4/AD4 pin connected to the OV pin of the signal amplifier 701 of the sensing unit 700, a PB5/AD5 pin connected to the first end of the second resistor 733 (as shown in FIG. 7B), and a PB6/AD6 pin connected to the pin 3 of the instruction decoder 755.

As further shown in FIG. 7C, the processor 751 also includes a GND pin connected to the low voltage source, a PA0/AD10 pin connected to the pin 4 of the instruction decoder 755, a PA4/AD9 pin connected to the pin 1 of the frequency decoder 753, a PA3/AD8 pin connected to the pin 2 of the frequency decoder 753, a PB3/AD3 pin connected to the pin 3 of the frequency decoder 753, a PB1/AD1 pin connected to the pin 4 of the frequency decoder 753, a PB0/AD0 pin connected to the pin 5 of the frequency decoder 753, and a PB2/AD2 pin connected to the pin 6 of the frequency decoder 753.

In operation, the sensing unit may detect motion and provide a signal indicative of the detection of motion (e.g., through the OV pin of the signal amplifier 701, which may be referred to as "induction input" in FIG. 7A) to the processor 751. The processor 751, in turn, may also provide a signal indicative of the detection of motion (e.g., via the PB5/AD5 pin of the processor 751, which may be referred to as "RF emission" in FIG. 7C) to the wireless transmitter. Additionally, in some embodiments, the processor 751 may further provide signals indicative of the various selected options provided by the instruction decoder 755, as previously discussed, to the wireless transmitter. The wireless transmitter in turn wirelessly communicates signals having information (based on the signals provided by the processor 751) to a control unit (for example, the control unit of FIG. 6) at a desired frequency.

Figure 8A:
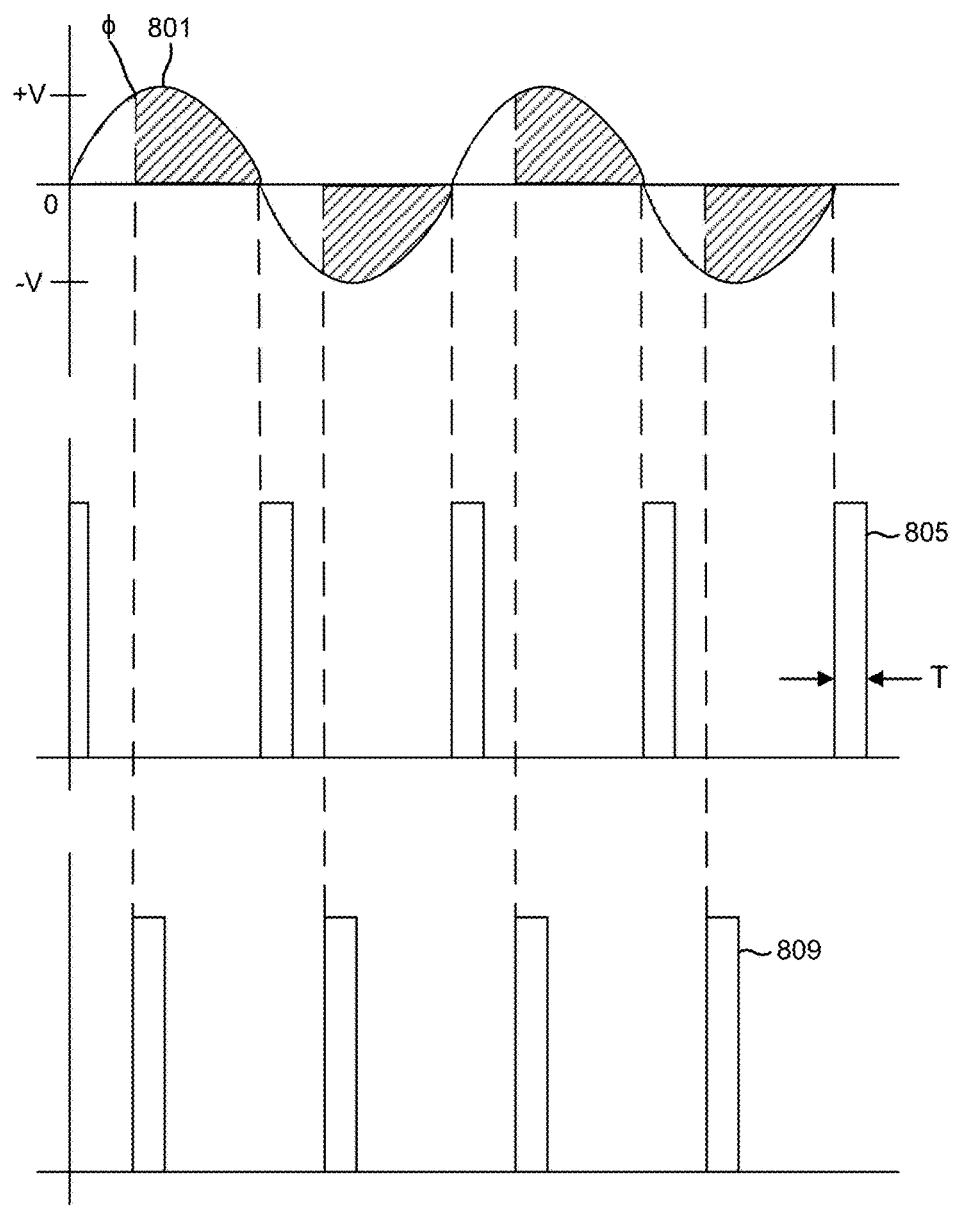
FIG. 8A diagrammatically illustrates a relationship between a zero-crossing detection signal and a trigger signal in accordance with aspects of the disclosure.

FIG. 8A illustrates a relationship between a zero-crossing detection signal and a trigger signal in accordance with aspects of the disclosure. A VAC cycle 801, which may be provided to a load by way of a switching device such as a triac, is in the form of a sine wave with a firing or conduction phase angle Ø ranging from 0° to 360°. When the VAC cycle is at or about 0V, a zero-crossing detection signal 805 generates a "high" level pulse having a pulse width T. In an exemplary embodiment, the "high" level pulse may have an amplitude of about 3-5 VDC. A processing unit may receive the zero-crossing detection signal 805 and generate a trigger signal 809 having "high" level pulses for triggering the switching device (e.g., a gate of the triac) to provide power to a light source (e.g., an AC light source). In some embodiments, the trigger signal may be time-shifted or time-delayed relative to the zero-crossing detection signal. The greater the delay time between the zero-crossing detection signal and the trigger signal, for example, the greater the firing or conduction phase angle on the VAC cycle is selected or activated (e.g., by the switching device) to provide power to the load, thereby reducing the energy delivered to the light source by the switching device and thus the illumination level of the light source. On the other hand, to increase the illumination level, the processing unit may decrease the delay time, thereby triggering the switching device to activate provision of power at a lower firing or conduction phase angle. In this case, more energy is delivered to the light source. As illustrated in FIG. 8A, for example, power provision to the light source is designated in a shaded region of the VAC cycle.

Figure 8B:
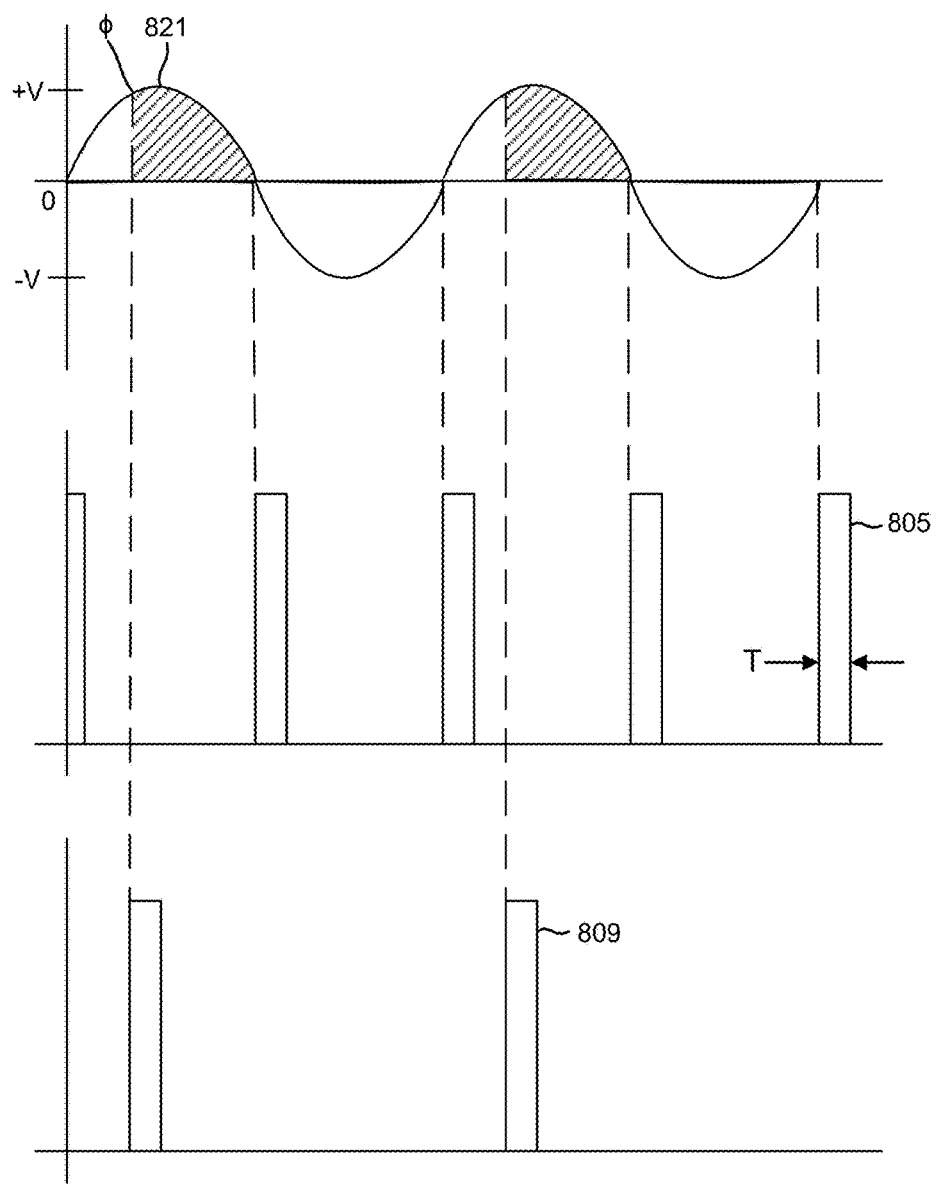
FIG. 8B diagrammatically illustrates a further relationship between a zero-crossing detection signal and a trigger signal with respect to input VAC provided to a switching device in accordance with aspects of the disclosure.

FIG. 8B illustrates a further relationship between a zero-crossing detection signal and a trigger signal with respect to input VAC provided to a switching device in accordance with aspects of the disclosure. In FIG. 8B, a VAC cycle 821 may be provided to a load by way of a switching device such as a silicon-controlled rectifier (SCR) or thyristor. The switching device generally conducts at a positive half cycle of the VAC cycle. The firing or conduction phase angle Ø for such a switching device, therefore, ranges from 0° to 180°. As previously discussed, the zero-crossing detection signal may generate a "high" level pulse of a pulse width T when the VAC cycle is about or at 0V. A processing unit may receive the zero-crossing detection signal 805 and generate a trigger signal 809 having "high" level pulses for triggering the switching device (e.g., a gate of SCR or thyristor) to activate provision of power to a light source. As previously discussed, the trigger signal may be time-shifted or time-delayed relative to the zero-crossing detection signal. The greater the delay time between the zero-crossing detection signal and the trigger signal, for example, the greater the firing or conduction phase angle on the half-wave VAC is selected or activated by the switching device to provide power to the load, thereby reducing the energy or power delivered to the light source via the switching device and thus reducing the illumination level. Conversely, to increase the illumination level, the processing unit may decrease the delay time, thereby triggering the switching device to activate provision of power at a lower firing or conduction phase angle, thereby delivering more energy or power to the light source. As illustrated in FIG. 8B, for example, power provision to the light source is designated in a shaded region of the VAC cycle.

Figure 9:
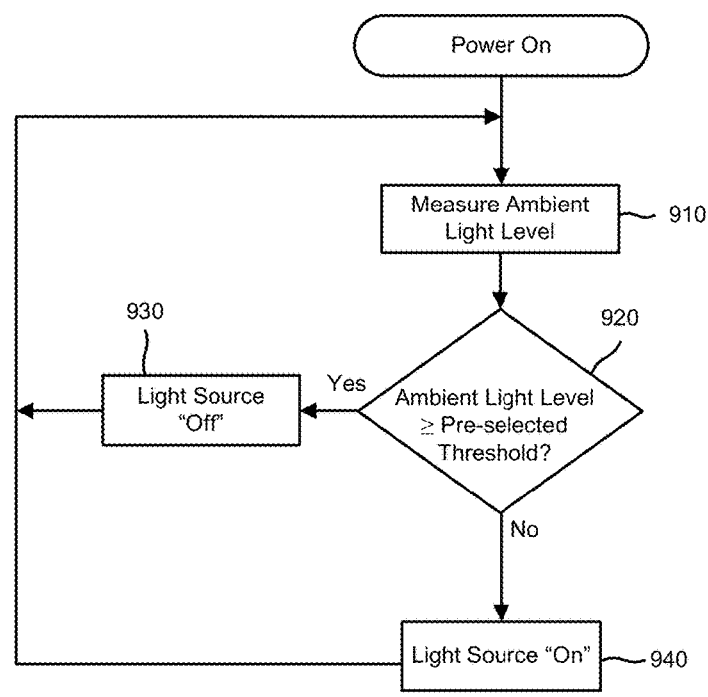
FIG. 9 is a flow diagram of a process for controlling the illumination or brightness level of a light source in accordance with aspects of the disclosure.

FIG. 9 is a flow diagram of a process for controlling illumination of a light source in accordance with aspects of the invention. In some embodiments, the process is performed by a processing unit of a control unit and/or light fixture, which may be any of the processing units as previously discussed in connection with FIGS. 2-5 and 6A-C. Upon a "power on," the process proceeds to block 910 for measuring an ambient light level. The process receives information regarding an intensity of ambient light, for example, from a photosensor output signal provided by a photosensor (e.g., the photosensors 160, 202, 302, 402, and 502 of FIGS. 1-5). For example, a resistance value may be determined from the output signal, with the resistance value corresponding to an ambient light level.

In block 920, the process determines whether the ambient light level is greater than or equal to a pre-selected or preset threshold. In some embodiments, the pre-selected threshold is 20 lux. In some embodiments, the pre-selected threshold may be adjustable by a consumer, for example by way of a switch or other user-operable control mechanism coupled to an appropriate input of the processing unit. In alternative embodiments, the pre-selected threshold may be adjustable by the consumer by way of a user interface, e.g., a GUI. If the ambient light level is greater than or equal to the pre-selected threshold, the process continues to block 930. Otherwise, the process continues to block 940.

In block 930, the process commands a light source (e.g., AC or DC light source) to turn off or remain off. For example, the process may command the processing unit to provide a trigger signal with a "low" state (for an AC light source) or a reference voltage having a "low" voltage value (for a DC light source), for example 0-0.8 VDC. In alternative embodiments, the process may command the processing unit to cease providing a signal. The process then returns to block 910 for another measurement of the ambient light level.

In block 940, the process commands the light source to turn on or stay on. For example, for an AC light source, the process may command the processing unit to provide a trigger signal with a "high" state or a trigger signal with no time delay or time shift with respect to a zero-crossing detection signal. With respect to a DC light source, in some embodiments the process may command the processing unit to provide a reference voltage having a "high" level voltage, for example 3-5 VDC. The process then returns to block 910.

Figure 10:
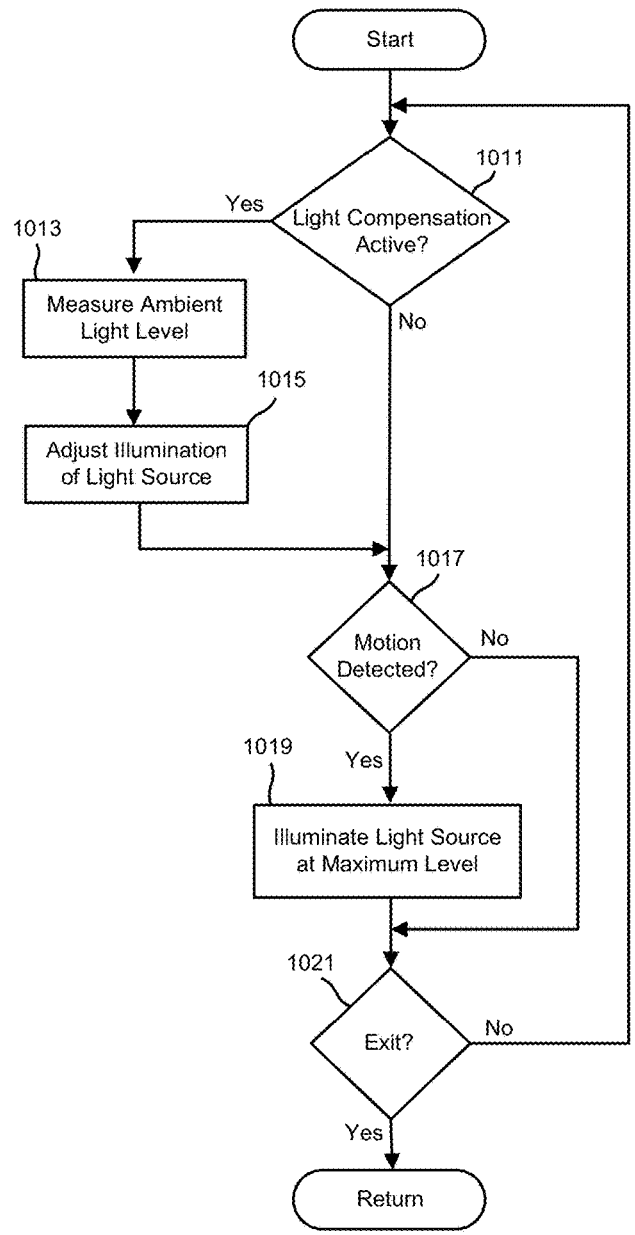
FIG. 10 is a flow diagram of a further process for controlling the illumination or brightness level of a light source in accordance with aspects of the disclosure.

FIG. 10 is a flow diagram of a further process for controlling illumination of a light source in accordance with aspects of the disclosure. In some embodiments, the process may be performed by one or more processors of a processing unit, which may be any of the processing units as previously discussed in connection with FIGS. 2-5 and 6A-C. In block 1011, the process determines whether light or optical compensation is active. In some embodiments, whether light compensation is active may be determined by an optical compensation signal provided to the processing unit, for example by way of a motion sensor receiver. A consumer, for example, may activate a switch (e.g., DIP switch) coupled to or within a wireless sensor kit to activate optical compensation. Upon activation of the switch, the wireless sensor kit may transmit the optical compensation signal (e.g., a "high" or "low" state signal) to the processing unit (by way of the motion sensor receiver) indicating that optical compensation is activated. In other embodiments, the optical compensation signal may be provided by an instruction decoder included in or coupled to the processing unit. If light compensation is active, the process continues to block 1013. Otherwise, the process continues to block 1017.

In block 1013, the process measures ambient light level. The process, for example, may receive information regarding an intensity of ambient light from a photosensor output signal provided by a photosensor, e.g., any of the photosensors as previously discussed in connection with FIGS. 1-5. In some embodiments, a resistance value may be determined from the photosensor output signal, with the resistance value corresponding to an ambient light level. The process then continues to block 1015.

In block 1015, the process adjusts illumination or brightness of a light source (e.g., AC or DC light source) based on the measured ambient light level. In some embodiments, the process may perform phase angle control or phase angle adjustment to adjust illumination of the light source. For example, the process may command the processing unit to generate a trigger signal that is time-shifted or time-delayed relative to a zero-crossing detection signal provided, for example, by a zero-crossing detector. The trigger signal, for example, may lag the zero-crossing detection signal by a first time period, with the trigger signal causing the light source to increase its illumination. In some embodiments, if the brightness level is increased for a first time from an "off" state, the brightness level is increased to an initial or start-up brightness level (e.g., 10% of maximum lumen output). Otherwise, the process may increase the brightness level in proportion to a decreasing ambient light level by decreasing, for example, a delay time period between the trigger signal and the zero-crossing detection signal. As noted above, decreasing the delay time period also triggers a switching device (e.g., triac, SCR, or thyristor) to activate provision of power to a load at a reduced firing phase angle on an input VAC waveform, thereby increasing the effective duty cycle of the switching device (e.g., a triac, SCR, or thyristor) and the ratio of "on" time to "off" time for the current supplied to the light source.

Conversely, the process may decrease the brightness level in proportion to an increasing ambient light level by increasing, for example, the delay time period between the trigger and zero-crossing detection signals. The trigger signal, for example, may lag the zero-crossing detection signal by a second time period that is greater than the first time period. Increasing the delay time period also triggers the switching device to activate provision of power at an increased firing phase angle, thereby decreasing the effective duty cycle of the switching device and the ratio of "on" time to "off" time for the current supplied to the light source.

In other embodiments, the process may command the processing unit to generate and provide a reference voltage to a DC light source controller to adjust illumination of the light source (e.g., by way of PWM). The DC light source controller may produce a series of pulses to control the brightness of a light source (e.g., a DC light source) based on the reference voltage. For example, the process may increase the brightness level in proportion to a decreasing ambient light level by commanding the processing unit to provide a first reference voltage so as to cause the DC light source controller to produce a series of pulses having an increased duty cycle (or a first duty cycle). Conversely, the process may decrease the brightness level in proportion to an increasing ambient light level by commanding the processing unit to provide a second reference voltage so as to cause the DC light source controller to produce a series of pulses having a reduced duty cycle (or a second duty cycle), wherein the second reference voltage is less than the first reference voltage and the second duty cycle is less than the first duty cycle. The process then continues to block 1017.

In block 1017, the process determines whether motion is detected. In some embodiments, a determination of whether motion is detected may be based on a motion sensor receiver output signal indicative of a detection of motion provided by a motion sensor receiver that, for example, is wirelessly coupled to a motion sensor or a wireless sensor kit. In other embodiments, the determination of whether motion is detected may be based on a motion sensor output signal provided directly by the motion sensor coupled to the processing unit. If motion is detected, the process continues to block 1019. Otherwise, the process continues to block 1021.

In block 1019, the process illuminates the light source at a maximum level (i.e., full or 100% brightness). In some embodiments, the process may command the processing unit to generate and provide a trigger signal having a "high" value (e.g., 3-5 VDC) or a trigger signal with no time delay relative to the zero-crossing detection signal, thereby triggering a switching device (e.g., a triac, SCR, or thyristor) to activate provision of power to a load at a firing phase angle at or about 0° on the input VAC waveform. Accordingly, the switching device would allow a full cycle or full half-cycle (depending on a type of switching device) of the input VAC to power the light source (e.g., an AC light source). In other embodiments, the process may command the processing unit to generate and provide a reference voltage having a high voltage level (e.g., 3-5 VDC) to the DC light source controller to provide, for example, PWM signals having a 100% or full duty cycle to illuminate the light source (e.g., a DC light source) at a maximum level. The process then continues to block 1021, in which the process determines whether it should exit. If so the process continues to RETURN. Otherwise, the process loops back to block 1011.

Figure 11:
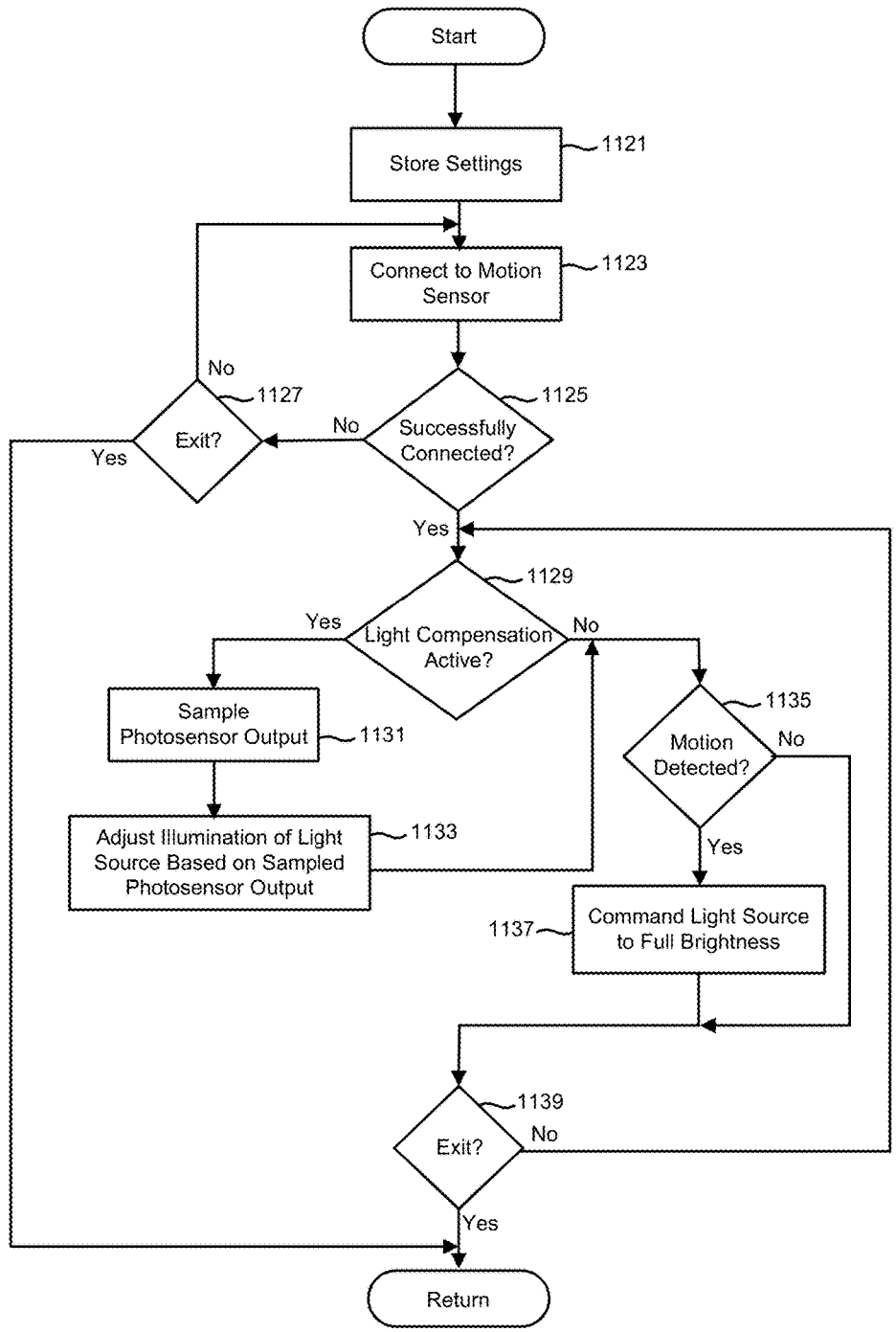
FIG. 11 is a flow diagram of a further process for controlling the illumination or brightness level of a light source in accordance with aspects of the disclosure.

FIG. 11 is a flow diagram of a further process for controlling illumination of a light source in accordance with aspects of the disclosure. In some embodiments, the process may be performed by one or more processors of a processing unit, which may be any of the processing units as previously discussed in connection with FIGS. 2-5 and 6A-C. In block 1121, the process stores settings, for example, to a storage or memory device. The settings may include adjustable options set by a consumer, such as a desired frequency for communication between a motion sensor and a motion sensor receiver, a standby lumen output level, enablement of optical compensation, a first selectable time period (in which, when no further motion is detected, the processing unit commands a light source to reduce its brightness to a previous, non-motion activated brightness level), and/or a second selectable time period (in which the brightness level of the light source remains at the standby lumen output level prior to turning off until an event occurs, such as when motion is detected). The process then continues to block 1123.

In block 1123, the process connects to a motion sensor or wireless sensor kit. In some embodiments, the process may command a motion sensor receiver to send a connection signal to the motion sensor or wireless sensor kit and then wait, for example, for a pre-determined time period for the motion sensor to respond or acknowledge. In other embodiments, if the motion sensor is not a wireless motion sensor (e.g., the motion sensor is directly coupled to the processing unit), the process may command the processing unit to send a connection signal to the motion sensor and wait for a pre-determined time period for the motion sensor to respond or acknowledge. The process then continues to block 1125.

In block 1125, the process determines whether the motion sensor or wireless sensor kit is successfully connected. For example, the motion sensor or wireless sensor kit is successfully connected when the motion sensor receiver or the processing unit receives an acknowledged signal, which may indicate receipt of the connection signal, from the motion sensor prior to expiration of the pre-determined time period. Otherwise, if the acknowledged signal is not received and the pre-determined time period has expired, then the motion sensor is not successfully connected. If the motion sensor is successfully connected, the process continues to block 1129. Otherwise the process continues to block 1127.

In block 1127, the process determines whether it should exit. For example, the process may exit if the motion sensor fails to connect after a pre-determined number of attempts. The process then proceeds to RETURN. Otherwise the process returns to block 1123.

In block 1129, the process determines whether light or optical compensation is active. As previously discussed, in some embodiments, whether light compensation is active may be determined by an optical compensation signal provided to the processing unit from the wireless sensor kit or from an instruction decoder included in or coupled to the processing unit. If light or optical compensation is active, the process continues to block 1131. Otherwise the process continues to block 1135.

In block 1131, the process samples outputs from a photosensor. For example, the process may sample a photosensor output signal at a sampling rate to obtain a digital value, which may be a resistance value, indicative of ambient light level. The process then continues to block 1133.

In block 1133, the process adjusts illumination or brightness of a light source based on the sampled photosensor output, for example, the value indicative of ambient light level. As previously discussed, the process may perform phase angle control or phase angle adjustment to adjust illumination of the light source. The process for example may command the processing unit to generate a trigger signal that is time-shifted or time-delayed relative to a zero-crossing detection signal provided by a zero-crossing detector. In some embodiments, if the brightness level is increased for a first time from an "off" state, the brightness level is increased to an initial or start-up brightness level (e.g., 10% of maximum lumen output). Otherwise, the process may increase the brightness level in proportion to a decreasing ambient light level by decreasing, for example, a delay time period between the trigger signal and the zero-crossing detection signal. As previously noted, decreasing the delay time period also triggers a switching device (e.g., a triac, SCR, or thyristor) to activate provision of power to a load at a reduced firing phase angle on an input VAC waveform, thereby increasing the effective duty cycle of the switching device and the ratio of "on" time to "off" time for the current supplied to the light source.

Conversely, the process may decrease the brightness level in proportion to an increasing ambient light level by increasing, for example, the delay time period between the trigger and zero-crossing detection signals. Increasing the delay time period also triggers the switching device to activate provision of power to a load at an increased phase angle, thereby decreasing the effective duty cycle of the switching device and the ratio of "on" time to "off" time for the current supplied to the light source. The process then continues to block 1135.

In block 1135, the process determines whether motion is detected. As previously discussed, in some embodiments, a determination of whether motion is detected may be based on a motion sensor receiver output signal provided by a motion sensor receiver that is wirelessly coupled to the motion sensor or wireless sensor kit. In other embodiments, the determination of whether motion is detected may be based on a motion sensor output signal provided by a motion sensor coupled to the processing unit. If motion is detected the process continues to block 1137. Otherwise the process continues to block 1139.

In block 1137, the process commands the light source to a full or 100% brightness level. In some embodiments, the process may command the processing unit to generate and provide a trigger signal having a "high" value (e.g., 3-5 VDC) or a trigger signal with no time delay relative to the zero-crossing detection signal, thereby triggering a switching device (e.g., a triac, SCR, or thyristor) to activate provision of power to a load at a firing phase angle at or about 0° on the input VAC waveform. Accordingly, the switching device would allow a full cycle or full positive half-cycle (depending on a type of switching device) of the input VAC to power the light source (e.g., an AC light source). In other embodiments, the process may command the processing unit to generate and provide a reference voltage having a high voltage level (e.g., 3-5 VDC) to the DC light source controller to provide, for example, PWM signals having a 100% or full duty cycle to illuminate the light source (e.g., a DC light source) at a maximum level. The process then continues to block 1139.

In block 1139, the process determines whether it should exit. The process, for example, may determine to exit if a loss in connection with the motion sensor occurs and/or there exists unresolvable errors within the processing unit. If the process determines to exit, the process returns. Otherwise the process returns to block 1129.

Figure 12:
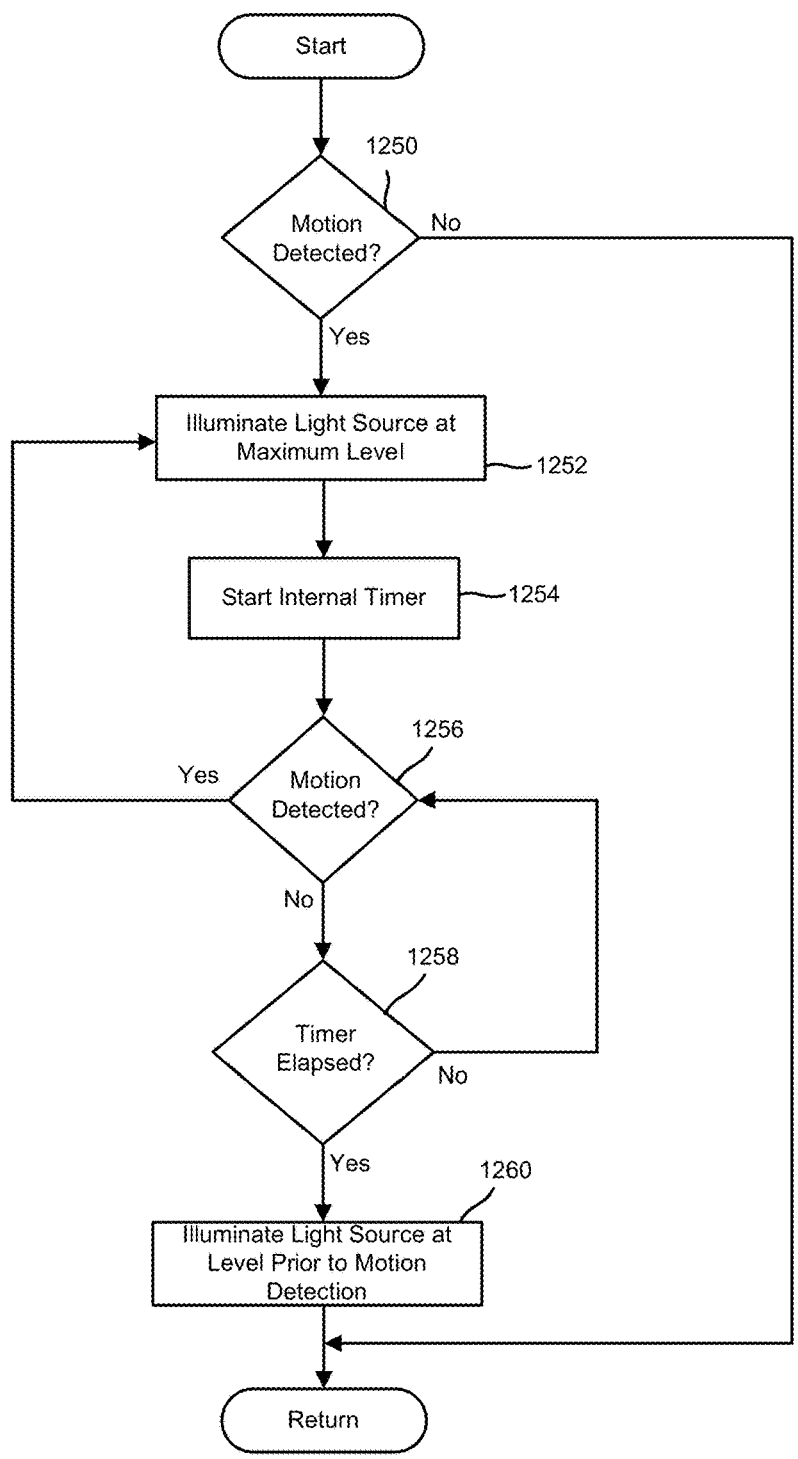
FIG. 12 is a flow diagram of a process for motion detection in accordance with aspects of the disclosure.

FIG. 12 is a flow diagram of a process for handling motion detection in accordance with aspects of the disclosure. In some embodiments, the process may be performed by one or more processors of a processing unit, which may be any of the processing units as previously discussed in connection with FIGS. 2-5 and 6A-C. In block 1250 the process determines if motion is detected. As previously discussed, in some embodiments, a determination of whether motion is detected may be based on a motion sensor receiver output signal provided by a motion sensor receiver wirelessly coupled to a motion sensor or wireless sensor kit. In other embodiments, the determination of whether motion is detected may be based on a motion sensor output signal provided by a motion sensor coupled to the processing unit. If motion is detected, the process continues to block 1252. Otherwise the process returns.

In block 1252, the process commands a light source to illuminate at a maximum level, e.g., 100% of maximum lumen output. In some embodiments, the process may command a processing unit to generate and provide a trigger signal having a "high" value (e.g., 3-5 VDC) or a trigger signal with no time delay relative to the zero-crossing detection signal thereby triggering a switching device (e.g., a triac, SCR, or thyristor) to activate provision of power to a load at a firing phase angle at or about 0° on the input VAC waveform. The switching device, therefore, would allow a full cycle or full positive half-cycle (depending on a type of switching device) of the input VAC to power the light source (e.g., an AC light source). In other embodiments, the process may command the processing unit to generate and provide a reference voltage having a high voltage level (e.g., 3-5 VDC) to the DC light source controller to provide, for example, PWM signals having a 100% or full duty cycle to illuminate the light source (e.g., a DC light source) at a maximum level. Then process then proceeds to block 1254.

In block 1254, the process starts or triggers a timer. The timer, for example, may be a hardware timer or a software count-down counter. Then process then continues to block 1256, in which the process again determines if motion is detected. If motion is detected the process returns to block 1252. Otherwise, the process continues to block 1258.

In block 1258, the process determines whether the timer has elapsed or expired. In some embodiments, the timer has expired if the hardware timer or the counter indicates a "0" value. If the timer has expired, the process continues to block 1260. Otherwise, the process returns to block 1256.

In block 1260, the process illuminates the light source to a previous, non-motion activated brightness level. As previously discussed, in some embodiments, the process may command the processing unit to increase a delay time between a zero-crossing detection signal and a trigger signal so as to trigger a switching device to activate provision of power to the light source at an increased firing phase angle (e.g., a phase angle greater than 10°). In other embodiments the process may command the processing unit to provide a reference voltage to a DC light source controller so as to decrease a duty cycle in PWM signals. The process then returns.

Figure 13:
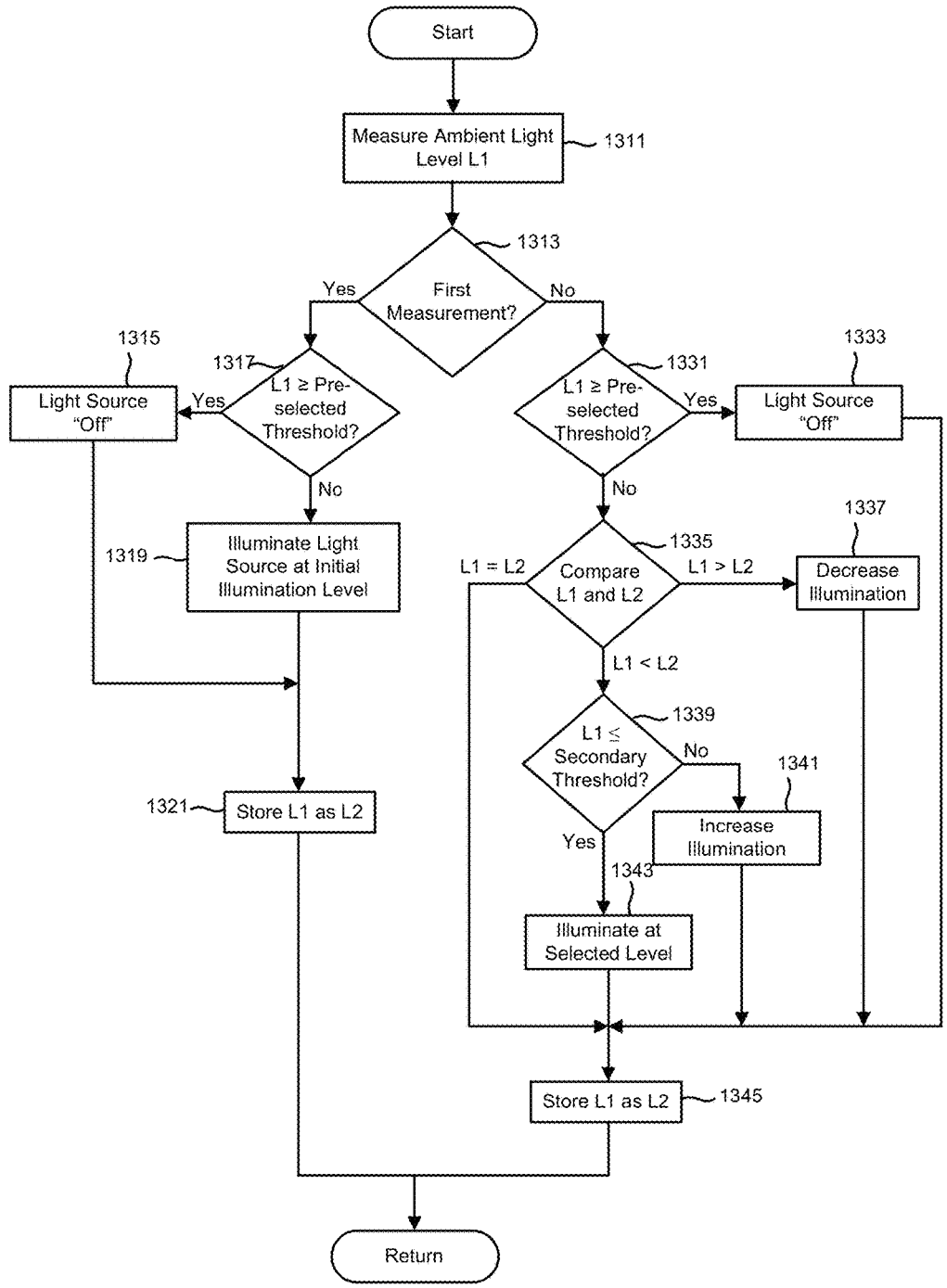
FIG. 13 is a flow diagram is a further process for controlling the illumination or brightness level of a light source in accordance with aspects of the disclosure.

FIG. 13 is a flow diagram is a further process for controlling illumination of a light source in accordance with aspects of the disclosure. In some embodiments, the process may be performed by one or more processors of a processing unit, which may be any of the processing units as previously discussed in connection with FIGS. 2-5 and 6A-C. In some embodiments, the process may also be performed by a combination of blocks 1013 and 1015 of FIG. 10.

In block 1311, the process measures a first ambient light level L1. The process, for example, by way of sampling of a photosensor output signal, may receive information regarding an intensity of ambient light. In some embodiments, a resistance value may be determined from the photosensor output signal, with the resistance value corresponding to an ambient light level. The process then continues to block 1313.

In block 1313, the process determines whether the first ambient light level L1 is a first measurement. In some embodiments, a determination of whether L1 is the first measurement may be based on a flag or information stored in a memory location of a storage or memory device. The flag, for example, may have a value of "0" or "1" wherein "F" is indicative of first measurement and "0" is indicative otherwise. If L1 is the first measurement, the process continues to block 1317. Otherwise, the process continues to block 1331.

In block 1317, the process determines whether L1 is greater than or equal to a pre-selected threshold. In some embodiments, the pre-selected threshold is 20 lux. If L1 is greater than or equal to the pre-selected threshold, the process continues to block 1315. Otherwise, the process continues to block 1319.

In block 1315, the process commands a light source (e.g., AC or DC light source) to turn off or remain off. For example, the process may command the processing unit to provide a trigger signal with a "low" state (e.g., for an AC light source) or a reference voltage having a "low" voltage value (e.g., for a DC light source) such as 0-0.8 VDC. In alternative embodiments, the process may command the processing unit to cease providing a signal. The process then continues to block 1321.

In block 1319, the process illuminates the light source at an initial or start-up illumination level (e.g., 10% of its maximum lumen output). In some embodiments, the process may command the processing unit to generate a trigger signal for triggering a switching device (e.g., a triac, SCR, or thyristor) to activate provision of power to the light source (e.g., AC light source) at a firing phase angle (e.g., at or about 162°) so as to cause the light source to illuminate at the initial illumination level. In other embodiments, the process may command the processing unit to generate and provide a reference voltage to a DC light source controller, with the DC light source controller providing for example PWM signals having a duty cycle (e.g., 10% duty cycle) that causes the light source (e.g., DC light source) to illuminate at the initial or start-up illumination level. The process then continues to block 1321.

In block 1321, the process stores the first ambient light level L1 as a second ambient light level L2. For example, the process may store or copy a value indicative of L1 into a first memory location of a storage or memory device, and label or designate the first memory location as L2. The process then returns.

In block 1331, as in block 1317 described above, the process determines whether L1 is greater than or equal to a pre-selected threshold, which may be, for example, 20 lux. If L1 is greater than or equal to the pre-selected threshold, the process continues to block 1333. Otherwise, the process continues to block 1335.

In block 1333, as in block 1315, the process commands the light source to turn off or remain off. For example, the process may command the processing unit to provide a trigger signal with a "low" state (e.g., for an AC light source) or a reference voltage having a "low" voltage value (e.g., for a DC light source) such as 0-0.8 VDC. In alternative embodiments, the process may command the processing unit to cease providing a signal. The process then continues to block 1345.

In block 1335, the process compares the second ambient light level L2 with the first ambient light level L1. L2, for example, may be the previously measured ambient light level L1 that is stored as L2 in block 1321, as previously discussed. If the second ambient light level L2 is equal or approximately equal to the first ambient level L1, the process continues to block 1345. If L1 is greater than L2, the process continues to block 1337, in which the illumination level or brightness of the light source is decreased. If L1 is less than L2, the process continues to block 1339.

As discussed above, if the comparison performed in block 1335 determines that L1 is greater than L2, the process proceeds to block 1337. In block 1337, the process decreases the illumination or the brightness level of the light source. As previously discussed, in some embodiments the process may perform phase angle control or phase angle adjustment functions so as to cause the processing unit to produce a trigger signal having an increased or greater time delay relative to a zero-crossing detection signal. The increase in the time delay may trigger a switching device to activate provision of power to the light source at a greater firing phase angle, thereby reducing the power delivered to the light source and the brightness level of the light source. In other embodiments, the process may command the processing unit to produce a decreased or lower reference voltage to a DC light source controller so as to cause the DC light source controller to generate, for example, PWM signals having a reduced duty cycle. As such, the power delivered to the light source is reduced, as is the brightness level of the light source. Then process then continues to block 1345.

As also previously discussed, if the comparison performed in block 1335 determines that L1 is less than L2, the process proceeds to block 1339. In block 1339, the process determines if L1 is less than or equal to a secondary threshold level. In some embodiments, the secondary threshold level is indicative of a lowest ambient light level, or, for example, when the night sky is at its darkest. If L1 is less than or equal to the secondary threshold level, the process continues to block 1343. Otherwise, the process continues to block 1341, in which the illumination level of the light source is increased.

In block 1341, the process increases the illumination or brightness level of the light source. As previously discussed, in some embodiments the process may perform phase angle control or phase angle adjustment functions so as to cause the processing unit to produce a trigger signal having a decreased or lower time delay relative to a zero-crossing detection signal. The decrease in the time delay may trigger the switching device to activate provision of power to the light source at a decreased or lower firing phase angle, thereby increasing the power delivered to the light source and the brightness level of the light source. In other embodiments, the process may command the processing unit to produce an increased or higher reference voltage to the DC light source controller so as to cause the DC light source controller to generate, for example, PWM signals having an increased duty cycle. Accordingly, the power delivered to the light source is increased, as is the brightness level of the light source. The process then continues to block 1345.

In block 1343, the process illuminates the light source at a pre-selected lumen output level, which may either be full (maximum) brightness, or some percentage (e.g., 25%, 33% or 50%) of full brightness. As discussed above, in some embodiments the process may perform phase angle control or phase angle adjustment operations to illuminate the light source (e.g., AC light source) at the pre-selected lumen output level. In other embodiments, as also discussed above, the process may command the processing unit to output a reference voltage to a DC light source controller for illuminating the light source (e.g., DC light source) at the pre-selected lumen output level. The process then continues to block 1345.

In block 1345, the process stores L1 as L2. For example, the process may store or update a value indicative of L1 into a second memory location of the storage or memory device, and label or designate the memory location as L2. In some embodiments, the second memory location is the same as the first memory location as discussed in block 1321. The process then returns.

Although the present disclosure includes various aspects and describes several embodiments, it will be appreciated that other variations, aspects, and embodiments are encompassed within the disclosure. Thus, for example, the specific components, devices, circuits, systems, and methods described herein, are to be considered representative of a range of equivalents, and are therefore not exclusive of any such equivalents.

What is claimed is:

1. A lighting system, comprising:
   a light source operatively coupled to a power source;
   a control unit operatively associated with the light source, and comprising:
   a motion sensing device operable to provide a motion sensor output signal in response to a detection of motion;
   a photosensor configured to sense ambient light and to generate a first photosensor output signal indicative of a first ambient light level and a second photosensor output signal indicative of a second ambient light level;
   a processing unit responsive to the motion sensor output signal, the first photosensor output signal, and the second photosensor output signal so as to control illumination of the light source by providing a first trigger signal based on the first photosensor output signal, a second trigger signal based on the second photosensor output signal, and a third trigger signal based on the motion sensor output signal; and an amplifier configured to respectively amplify the first trigger signal, the second trigger signal, and the third trigger signal, wherein the control unit further comprises: an optocoupler, an RC filter, a first rectifier, and a second rectifier, the optocoupler including a light-emitting element coupled to a light-sensitive element, each of the first and second rectifiers including a set of diodes connected in a closed loop configuration;

wherein the light source is responsive (a) to the first amplified trigger signal to illuminate at a first brightness level, (b) to the second amplified trigger signal to illuminate at a second brightness level, and (c) to the third amplified trigger signal to illuminate at a full brightness level, the full brightness level being greater than the second brightness level, the second brightness level being greater than the first brightness level.

2. The lighting system of claim 1, wherein the motion sensing device includes a motion sensor operatively coupled to a motion sensor receiver configured to generate the motion sensor output signal in response to motion detected by the motion sensor.

3. The lighting system of claim 1, wherein the control unit further comprises a zero-crossing detector configured to receive input AC voltage (VAC) and to provide a zero-crossing detection signal based on the VAC, wherein the processing unit is responsive to the zero-crossing detection signal to provide a first duty cycle for the first trigger signal and a second duty cycle for the second trigger signal.

4. The lighting system of claim 3, wherein the first duty cycle is determined by a first delay period relative to the zero-crossing detection signal, and the second duty cycle is determined by a second delay period relative to the zero-crossing detection signal.

5. The lighting system of claim 4, wherein the control unit further comprises a switching element configured to regulate provision of power to the light source from the power source, the switching element being operable to (a) provide power to the light source at a first phase angle of an AC cycle based on the first amplified trigger signal, (b) provide power to the light source at a second phase angle of the AC cycle based on the second amplified trigger signal, and (c) provide power to the light source at a third phase angle of the AC cycle based on the third amplified trigger signal.

6. The lighting system of claim 5, wherein the first and second phase angles are greater than 0°, and the third phase angle is 0°.

7. The lighting system of claim 2, wherein the processing unit further includes a frequency decoder operable for selection of a desired frequency for communication between the motion sensor and the motion sensor receiver.

8. The lighting system of claim 7, wherein the processing unit further includes an instruction decoder operable for selection of one or more of (a) a selectable standby brightness level for the light source that is less than the full brightness level, (b) a first selectable time period during which the brightness level remains at the full brightness level after detection of motion, before the brightness level returns to the standby brightness level, and (c) a second selectable time period in which the brightness level of the light source remains at the standby brightness level prior to the light source turning off until motion is detected.

9. The lighting system of claim 1, wherein the processing unit is configured to gradually increase illumination of the light source from an initial brightness level to a standby brightness level that is less than a full brightness level for the light source.

10. The lighting system of claim 9, wherein at least one of the initial brightness level and the standby brightness level is adjustable.

11. The lighting system of claim 1, wherein the processing unit is configured to gradually decrease the brightness level of the light source until the light source is turned off.

12. A light fixture, comprising:
a light source, a motion sensor configured to detect motion of an object in a vicinity of the light source and to communicate a motion sensor output signal in response to detected motion;
a photosensor configured to detect ambient light in the vicinity of the light source and to generate a photosensor output signal having a value inversely proportional to an ambient light level;
a processing unit operatively associated with the light source and configured to operate the light source at a variable brightness level between a first brightness level and a second brightness level in response to the photosensor output signal, and at a full brightness level in response to the motion sensor output signal, wherein the variable brightness level is determined by a trigger signal generated by the processing unit that is time-shifted relative to a zero-crossing detection signal; and
an amplifier configured to amplify the time-shifted trigger signal, wherein the light fixture further comprises an optocoupler, an RC filter, a first rectifier, and a second rectifier, the optocoupler including a light-emitting element coupled to a light-sensitive element, each of the first and second rectifiers including a set of diodes connected in a closed loop configuration.

13. The light fixture of claim 12, further comprising a zero-crossing detector configured to generate the zero-crossing detection signal based on an input AC voltage (VAC).

14. The light fixture of claim 13, wherein the light source is configured to receive power from a power source, the fixture further comprising a switching element configured to supply power to the light source from the power source at a conduction phase angle of the input VAC based on the amplified time-shifted trigger signal.

15. The light fixture of claim 12, wherein the first brightness level is a start-up brightness level, and the second brightness level is a standby brightness level.

16. The light fixture of claim 12, wherein the processing unit is configured to operate the light source at the full brightness level for a first selectable time period after motion is detected, before the brightness level of the light source is reduced to a standby brightness level between the first and second brightness levels.

17. The light fixture of claim 16, wherein the processing unit is configured to operate the light source at the standby brightness level for a second selectable time period prior to turning off the light source until motion is detected.

18. A method for controlling illumination of a light source of a lighting system including the light source and a control unit operatively associated with the light source, the control unit including a motion sensing device operable to provide a motion detection signal, a photosensor configured to sense ambient light, and a processing unit responsive to output signals of the motion sensing device and the photosensor, the method comprising:
generating a first photosensor output signal indicative of a first ambient light level at the photosensor, and a second photosensor output signal indicative of a second ambient light level at the photosensor;

providing a first trigger signal based on the first photosensor output signal, and a second trigger signal based on the second photosensor output signal; respectively amplifying the first trigger signal and the second trigger signal by an amplifier included in the control unit, wherein the control unit further comprises an optocoupler, an RC filter, a first rectifier, and a second rectifier, the optocoupler including a light-emitting element coupled to a light-sensitive element, each of the first and second rectifiers including a set of diodes connected in a closed loop configuration;

operating the light source to illuminate at a first brightness level in response to the first amplified trigger signal, and at a second brightness level in response to the second amplified trigger signal received after the first amplified trigger signal, when there is no detection of motion;

generating a motion detection signal in response to the detection of motion in a vicinity of the light source;

providing a third trigger signal based on the motion detection signal;

amplifying, by the amplifier, the third trigger signal; and operating the light source to illuminate at a full brightness level greater than the second brightness level for a period of time in response to the third amplified trigger signal, the full brightness level being greater than the second brightness level, the second brightness level being greater than the first brightness level.

19. The method of claim 18, wherein the period of time is selectably variable.

20. The method of claim 18, wherein operating the light source to illumination at one of the first, second, and third brightness levels includes phase angle controlling of an AC voltage (VAC) sine wave.

21. The method of claim 20, wherein the phase angle controlling of the VAC sine wave includes generating the first trigger signal delayed by a first delay relative to a zero-crossing detection signal and the second trigger signal delayed by a second delay relative to the zero-crossing detection signal.

22. The method of claim 21, wherein the zero-crossing detection signal is generated by a zero-crossing detector when an input VAC is substantially 0V in the VAC sine wave.

23. The light fixture of claim 16, wherein the processing unit is configured to operate the light source at the full brightness level for the defined time interval after motion is detected.

24. A lighting system, comprising:
a light source operatively coupled to a power source;
a control unit operatively associated with the light source, and comprising: a motion sensing device operable to provide a motion sensor output signal in response to a detection of motion;
a photosensor configured to sense ambient light and to generate a first photosensor output signal indicative of a first ambient light level and a second photosensor output signal indicative of a second ambient light level;
a processing unit responsive to the motion sensor output signal, the first photosensor output signal, and the second photosensor output signal so as to control illumination of the light source by providing a first trigger signal when the first photosensor output signal has a value lower than a first threshold value, a second trigger signal when the second photosensor output signal has a value lower than a second threshold value different from the first threshold value, and a third trigger signal in response to the motion sensor output signal;
a zero-crossing detector configured to receive input AC voltage (VAC) and to provide a zero-crossing detection signal based on the input VAC;
an amplifier configured to respectively amplify the first trigger signal, the second trigger signal, and the third trigger signal, wherein the control unit further comprises an optocoupler, an RC filter, a first rectifier, and a second rectifier, the optocoupler including a light-emitting element coupled to a light-sensitive element, each of the first and second rectifiers including a set of diodes connected in a closed loop configuration; and
a switching element configured to regulate provisioning of power to the light source using the amplified first, second, and third trigger signals, the switching element controlling provisioning relative to a phase angle of an AC cycle;
wherein the light source is responsive to (a) the first amplified trigger signal to illuminate at a first brightness level, (b) the second amplified trigger signal to illuminate at a second brightness level, and (c) the third amplified trigger signal to illuminate at a full brightness level, the full brightness level being greater than the second brightness level, the second brightness level being greater than the first brightness level.

25. The lighting system of claim 1, wherein the RC filter includes a capacitor connected in parallel with a resistor.

26. The light fixture of claim 12, wherein the RC filter includes a capacitor connected in parallel with a resistor.

27. The method of claim 18, wherein the RC filter includes a capacitor connected in parallel with a resistor.

28. The lighting system of claim 24, wherein the RC filter includes a capacitor connected in parallel with a resistor.

* * * * *